US012572587B1

(12) United States Patent
Boning et al.

(10) Patent No.: US 12,572,587 B1
(45) Date of Patent: Mar. 10, 2026

(54) AUGMENTING A GEOSPATIAL REPRESENTATION WITH TIME SERIES AND EVENT FUNCTIONALITIES

(71) Applicant: Palantir Technologies Inc., Denver, CO (US)

(72) Inventors: Gabriel Boning, Denver, CO (US); Jesse Rickard, Denver, CO (US); Thomas Henri Labadie, Denver, CO (US); Timothy Slatcher, Denver, CO (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/537,457

(22) Filed: Dec. 12, 2023

Related U.S. Application Data

(60) Provisional application No. 63/431,988, filed on Dec. 12, 2022.

(51) Int. Cl.
| | |
|---|---|
| *G06F 16/435* | (2019.01) |
| *G06F 16/44* | (2019.01) |
| *G06F 16/487* | (2019.01) |
| *G06F 9/451* | (2018.01) |

(52) U.S. Cl.
CPC .......... *G06F 16/444* (2019.01); *G06F 16/435* (2019.01); *G06F 16/487* (2019.01); *G06F 9/453* (2018.02)

(58) Field of Classification Search
CPC .... G06F 16/444; G06F 16/435; G06F 16/487; G06F 9/453
See application file for complete search history.

(56) References Cited

U.S. PATENT DOCUMENTS

| | | | | |
|---|---|---|---|---|
| 7,746,343 | B1 * | 6/2010 | Charaniya | G06N 7/01 |
| | | | | 345/428 |
| 11,030,560 | B1 * | 6/2021 | Brandt | G08G 1/202 |
| 2008/0229248 | A1 * | 9/2008 | Fagans | H04N 1/00453 |
| | | | | 715/838 |
| 2009/0164439 | A1 * | 6/2009 | Nevins | G06F 16/2477 |
| 2010/0106801 | A1 * | 4/2010 | Bliss | G06T 11/60 |
| | | | | 709/219 |
| 2010/0332468 | A1 * | 12/2010 | Cantrell | G06F 16/29 |
| | | | | 707/706 |
| 2011/0081919 | A1 * | 4/2011 | Das | H04W 4/024 |
| | | | | 455/456.1 |

(Continued)

FOREIGN PATENT DOCUMENTS

WO        WO-2011091298 A1 *   7/2011   .......... G09B 29/106

*Primary Examiner* — Sherief Badawi
*Assistant Examiner* — Earl Levi Elias
(74) *Attorney, Agent, or Firm* — Sheppard Mullin Richter & Hampton LLP

(57)        ABSTRACT

Provided herein are methods for obtaining or generating a map representation, receiving a query pertaining to a location within the map representation, in response to receiving the query, obtaining event data at the location from an external source, obtaining sensor data from an external sensor, the sensor data including time series data and being mapped to the event data according to an ontology, based on a geospatial or temporal relationship between the event data and the sensor data, and augmenting the map representation with the event data and the sensor data.

20 Claims, 21 Drawing Sheets

(56)        References Cited

U.S. PATENT DOCUMENTS

2013/0268878 A1*  10/2013  Le Roux ................. G09B 9/08
                                                                  715/772
2014/0162219 A1*   6/2014  Stankoulov ......... G09B 19/167
                                                                  434/65
2019/0113345 A1*   4/2019  Stewart ................. G06F 3/0483

* cited by examiner

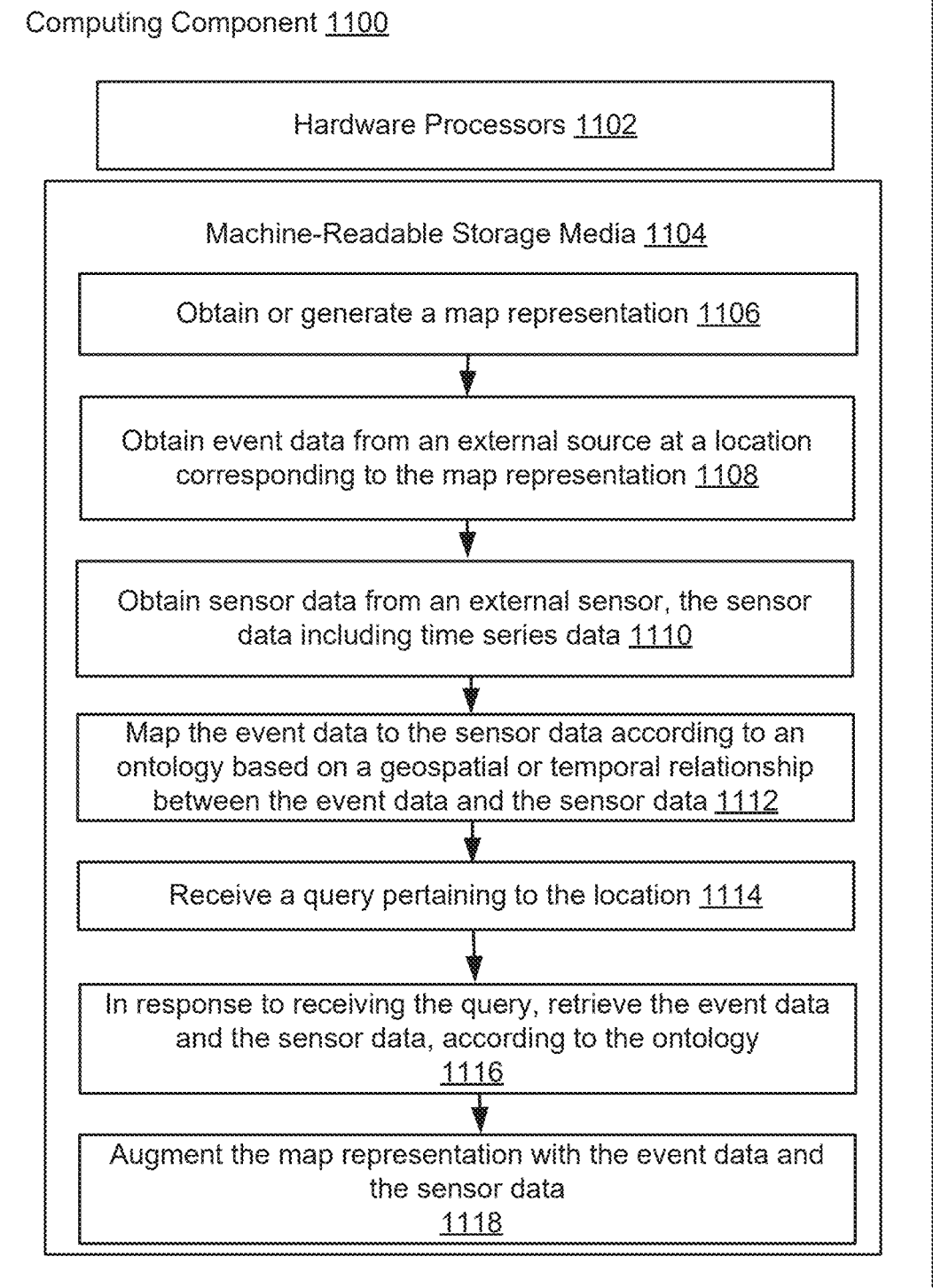

Computing Component 1100

Hardware Processors 1102

Machine-Readable Storage Media 1104

Obtain or generate a map representation 1106

Obtain event data from an external source at a location corresponding to the map representation 1108

Obtain sensor data from an external sensor, the sensor data including time series data 1110

Map the event data to the sensor data according to an ontology based on a geospatial or temporal relationship between the event data and the sensor data 1112

Receive a query pertaining to the location 1114

In response to receiving the query, retrieve the event data and the sensor data, according to the ontology 1116

Augment the map representation with the event data and the sensor data 1118

| Processor(s) 1904 | Network Interface(s) 1918 |
|---|---|

Bus 1902

| Main Memory 1906 | ROM 1908 | Storage 1910 |
|---|---|---|

| Display 1912 | Input Device(s) 1914 | Cursor Control 1916 |
|---|---|---|

AUGMENTING A GEOSPATIAL REPRESENTATION WITH TIME SERIES AND EVENT FUNCTIONALITIES

CROSS REFERENCE TO RELATED APPLICATION

This application claims the benefit under 35 U.S.C. 119(e) of U.S. Provisional Application No. 63/431,988, filed Dec. 12, 2022, the content of which is hereby incorporated in its entirety.

FIELD OF THE INVENTION

This disclosure relates to approaches of augmenting an existing geospatial representation with new or enhanced analysis functionalities, such as different data formats or types including time series data, and analysis or depiction of events.

BACKGROUND

Existing geospatial representations may be plagued by shortcomings such as limited analysis and/or visualization capabilities. For example, different data types or formats, such as time series data may not be fully leveraged within, or synchronized with, existing geospatial representations, such as in geographic information systems. Thus, the integration and/or synchronization of different data types and/or formats may be a conundrum du jour within the realm of computer mapping.

SUMMARY

Various embodiments of the present disclosure can include computing systems, methods, and non-transitory computer-readable media.

In some aspects, the techniques described herein relate to a system including: one or more processors; and a memory storing instructions that, when executed by the one or more processors, cause the system to perform, obtaining or generating a map representation; receiving a query pertaining to a location within the map representation; in response to receiving the query: obtaining event data at the location from an external source; obtaining sensor data from an external sensor, the sensor data including time series data and being mapped to the event data according to an ontology, based on a geospatial or temporal relationship between the event data and the sensor data; and augmenting the map representation with the event data and the sensor data.

In some aspects, the ontology comprises the event data and the sensor data, and the instructions further cause the system to perform: updating the ontology in response to receiving updated event data or updated sensor data.

In some aspects, the ontology comprises the event data and the sensor data, and the instructions further cause the system to perform: determining, based on the ontology, one or more related entities associated with the event data and the sensor data based on a temporal proximity or a spatial proximity between the one or more related entities and the event data or the sensor data.

In some aspects, the augmenting of the map representation comprises pictorially or textually overlaying the event data and the sensor data onto the map representation.

In some aspects, the map representation comprises layers, the layers comprising a vector layer or a JavaScript Object Notation (JSON) layer.

In some aspects, the map representation comprises a 3-dimensional (3-D) representation, and the query comprises a selection of a 3-D geographical region.

In some aspects, the query comprises a selection of a geographical region and additional filter criteria; and the instructions further cause the system to perform: determining ranges of geographic coordinates corresponding to boundaries of the selected geographical region; retrieving, from the ontology, any matches of entities within the ranges of geographic coordinates; and retaining any of the matches that satisfy the additional filter criteria.

In some aspects, the instructions further cause the system to perform: generating a track corresponding to the event data, the track indicating a previous path of travel or traverse for an entity corresponding to the event data; and overlaying the track onto the map representation.

In some aspects, the instructions further cause the system to perform: predicting a future direction of motion, a future behavior, a future parameter, or a future occurrence of an event associated with an entity based on the event data and the sensor data.

In some aspects, the instructions further cause the system to perform: receiving an annotation to a selected region or to a selected entity; and displaying the annotation within a tooltip upon detecting a hovering over the selected region or the selected entity.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIGS. 1A-1H may also be applicable to any of FIGS. 2A-2C, 3-6, and vice versa.

FIG. 11 illustrates a flowchart of an example method of georeferencing stabilization, in accordance with various embodiments of the present technology.

DETAILED DESCRIPTION

Figure 1A:
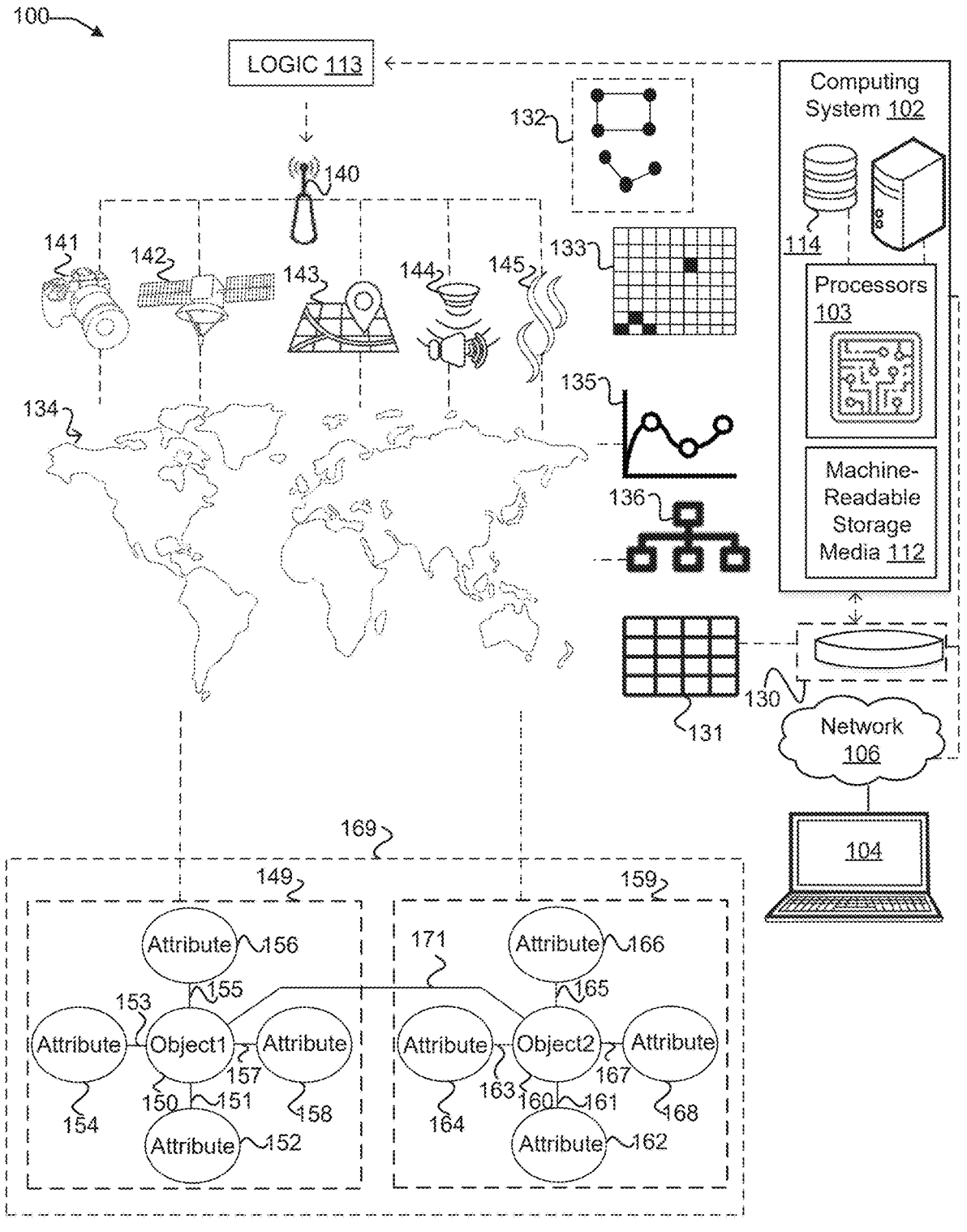
FIGS. 1A-1H illustrate example implementations, of a computing system that augments existing functionalities of computer mapping with time series data and event data, using an ontology.

FIGS. 1A-1H illustrate example implementations or scenarios (hereinafter "implementations") 100, of a computing system 102 that augments existing functionalities of computer mapping. In FIG. 1A, the implementation 100 can include at least one computing device 104 which may be operated by an entity such as a user. The user may submit a request or query through the computing device 104. Such a request or query may relate to operations on or pertaining to results of analysis or processing of a mapping and/or geospatial query. Such a mapping and/or geospatial query may encompass events and/or activities within a particular geographic region or boundary, and/or within a particular time range, and/or conducted by, related to, or otherwise associated with a particular entity. Other examples of queries may include other sensor data, time series data, and/or relationship data with one or more other entities, that correspond to one or more particular locations and/or one or more particular entities. Particular queries may seek to determine objects related to a set of facilities such as airports, other airports within a given distance of a particular airport, and route between airports. The query may include one, and only one, object parameter, which may specify a single object, an object array indicative of a specified type of object, or an object set indicative of a specified type of category of object. A result of a query may encompass or return a data structure that includes one or more objects including a target object, a source object, and an intermediary object, one or more edges or arcs indicating one or more connections between the source object, the target object, and/or the intermediary object, and time series data corresponding to the one or more objects.

A portion or all of the results, or intermediate outputs or results, of analysis or processing, along with raw data to be analyzed and/or processed, may be stored in a database 130.

In some examples, the computing device 104 may visually render any outputs generated from analysis or processing, and/or from the database 130. In general, the user can interact with the database 130 directly or over a network 106, for example, through one or more graphical user interfaces, application programming interfaces (APIs), and/or webhooks. The computing device 104 may include one or more processors and memory.

The computing system 102 may include one or more processors 103 which may be configured to perform various operations by interpreting machine-readable instructions, for example, from a machine-readable storage media 112. In some examples, one or more of the processors 103 may be combined or integrated into a single processor, and some or all functions performed by one or more of the processors 103 may not be spatially separated, but instead may be performed by a common processor. The processors 103 may be physical or virtual entities. For example, as virtual entities, the processors 103 may be encompassed within, or manifested as, a program within a cloud environment. The computing system 102 may also include a storage 114, which may include a cache for faster access compared to the database 130.

The processors 103 may further be connected to, include, or be embedded with logic 113 which, for example, may include protocol that is executed to carry out the functions of the hardware processors 103. In general, the logic 113 may be implemented, in whole or in part, as software that is capable of running on the computing system 102, and may be read or executed from the machine-readable storage media 112. The logic 113 may include, as nonlimiting examples, parameters, expressions, functions, arguments, evaluations, conditions, and/or code. Here, in some examples, the logic 113 encompasses functions of or related to processing or analysis of geospatial and/or mapping functionalities. Functions or operations described with respect to the logic 113 may be associated with a single processor or multiple processors. Functions or operations within the logic 113 will be subsequently described, following a description of the database 130.

The database 130 may include, or be capable of obtaining, information such as relational data and/or time series data of locations and/or entities, which may be from various sources such as different external sensors. The format of the information may be unstructured (e.g., media such as audio or video, or unstructured text) and/or structured. The database 130 may, additionally or alternatively, store multiple representations of the information, which may be displayed, generated, populated, and/or manifested as different layers of a display, for example, on an interface of the computing device 104. As a nonlimiting example, a first representation may include a general reference or planimetric map, a second representation may include a political map, a third representation may include a physical map, a fourth representation may include a terrain map, a fifth representation may include a thematic map, a sixth representation may include a navigational map, a seventh representation may include a cadastral map, and an eighth representation may include a road map. Such representations may be automatically (e.g., computer) and/or manually generated or labelled. The database 130 may be indexed, for example, by an index 131. Additionally or alternatively, the information may be stored in file format, for example, within the cache 114 and/or the database 130. The index 131 may permit searching for objects or entities, or layers.

The logic 113 may be configured to perform processing and/or analysis functions by ingesting, obtaining, receiving, and/or generating a first representation 134, which may encompass any of the first through eighth representations, and/or any appropriate representations. The first representation 134 may include and/or be augmented with sensor data 140, which may encompass image data 141 (hereinafter "image data") generated from any of a camera, Lidar, and/or radar, satellite data 142, Global Positioning System (GPS) data 143, audio data 144, and/or smell or scent data 145. The satellite data 142, may, in some examples, include a satellite image, an aerial image, or a scan of a physical map. Additionally or alternatively, the first representation 134 may include and/or be augmented with time series data 135, relational data 136, vector data 132 (e.g. high scale vector data), and/or raster data 133. The time series data 135 may be polled at certain frequencies so that the first representation 134 may be updated based on the polling. The first representation may be rendered according to a Web Mercator projection. Latitude and longitude coordinates may be in World Geodetic System (WGS) 84 coordinates.

The information and/or representations thereof may be organized according to an ontology 169. The ontology 169 may describe primitives, such as entities, which may be represented as objects, properties or attributes of the entities, which may incorporate constraints, and relationships or links between the entities. The attributes, in some examples, may be derived, manually inputted, or obtained from other sources such as external sensors. An ontology may be manifested as a specific organization, arrangement, categorization, or classification scheme such as a database, or a schema definition corresponding to entities, properties, and relationships. Databases may include a SQL, NoSQL, relational, non-relational, document, or graph database. Meanwhile, a schema definition may map particular tables, columns and/or rows of a table to particular entities and/or attributes. As a nonlimiting example, the ontology 169 may include or describe an object 150 and attributes 152, 154, 156, and 158 thereof, as connected by respective links 151, 153, 155, and 157. The ontology 169 may include or describe an object 160 and attributes 162, 164, 166, and 168 thereof, as connected by respective links 161, 163, 165, and 167. A connection 171 between the object 150 and the object 160 may indicate that the object 150 is related to the object 160, a manner in which the object 150 and the object 160 are related, and/or a predicted or determined degree of proximity between the object 150 and the object 160. For example, if the object 150 corresponds to a vehicle and the object 160 corresponds to a facility, the connection 171 may indicate time ranges at which the object 150 was present at a location corresponding to the object 160. The object 150 and/or the object 160 may originally be part of the first representation 134, and/or from the sensor data 140. The ontology 169 may incorporate any of the sensor data 140 and/or the time series data 135, relational data 136, vector data 132 (e.g. high scale vector data), and/or raster data 133. Therefore, the logic may retrieve connected or related objects, such as two entities that were within a threshold distance at a given point in time, using the ontology 169, and providing a manifestation or indication of such connection or relationship, for example, as an overlay or layer of a map representation.

Thus, if the logic 113 receives a query from the computing device 104 regarding or related to an entity, the logic 113 may retrieve or extract information based on the ontology 169. For example, a subject of a query may include a facility such as a plant, building, or structure, a location, a vehicle, or a person. The logic 113 may identify that the subject of the query matches the object 150 and/or the object 160. Attributes of the object 150 and/or the object 160 may include a type, and/or other properties or characteristics such as time series data. The attributes may be in structured and/or unstructured format, such as, structured text, unstructured text, and/or media (e.g., video or audio). By retrieving or extracting the attributes, the logic 113 may display or populate information of or pertaining to the attributes in text, pictorial, and/or map form, and/or overlay the information as a layer on top of the representation 134 or some other representation, such as a second representation 144 in FIGS. 1B-1H. Although the foregoing describes overlays and/or other features onto, or pertaining to, the second representation 144, the overlays may also be applied to any other map representation, such as the first representation 134. Each layer may comprise a vector layer or a JavaScript Object Notation (JSON) layer. The JSON layer may be applicable for raster layers. In some examples, the JSON layer may include atmospheric gradient, stars, and/or haze to improve depth perception. In some examples, the JSON layer may include different and adjustable degrees or extents of opacity in different portions of the JSON layer.

The information may also include other entities related to the subject of the query, and/or a nature of such relationship. For example, if the subject of the query is a facility, the information may also include which vehicles and/or persons were at a location of the facility and respective time ranges at which the vehicles and/or persons were at the location. Therefore, by accessing the ontology 169, the computing system 102 may not only provide answers to a query, but also augment the answers with information of related entities and/or a depiction of such a relationship.

Additionally, as the sensor data 140 and/or the time series data 135 is continuously updated, such updates may be continuously written into the ontology 169. Therefore, upon receiving future queries, the logic 113 may access updated versions of the ontology 169. In some examples, the updates to the ontology 169 may occur at specified time intervals, rather than continuously as updates arrive.

FIGS. 1B-1H illustrate examples of different queries and mechanisms of retrieving results. In some examples, different queries and/or intermediate or final results thereof may correspond to different templates. Thus, when generating or obtaining results of a particular query, the logic 113 may generate a template. The template may be saved, for example, within the database 130 and/or in the cache 114.

Figure 1B:
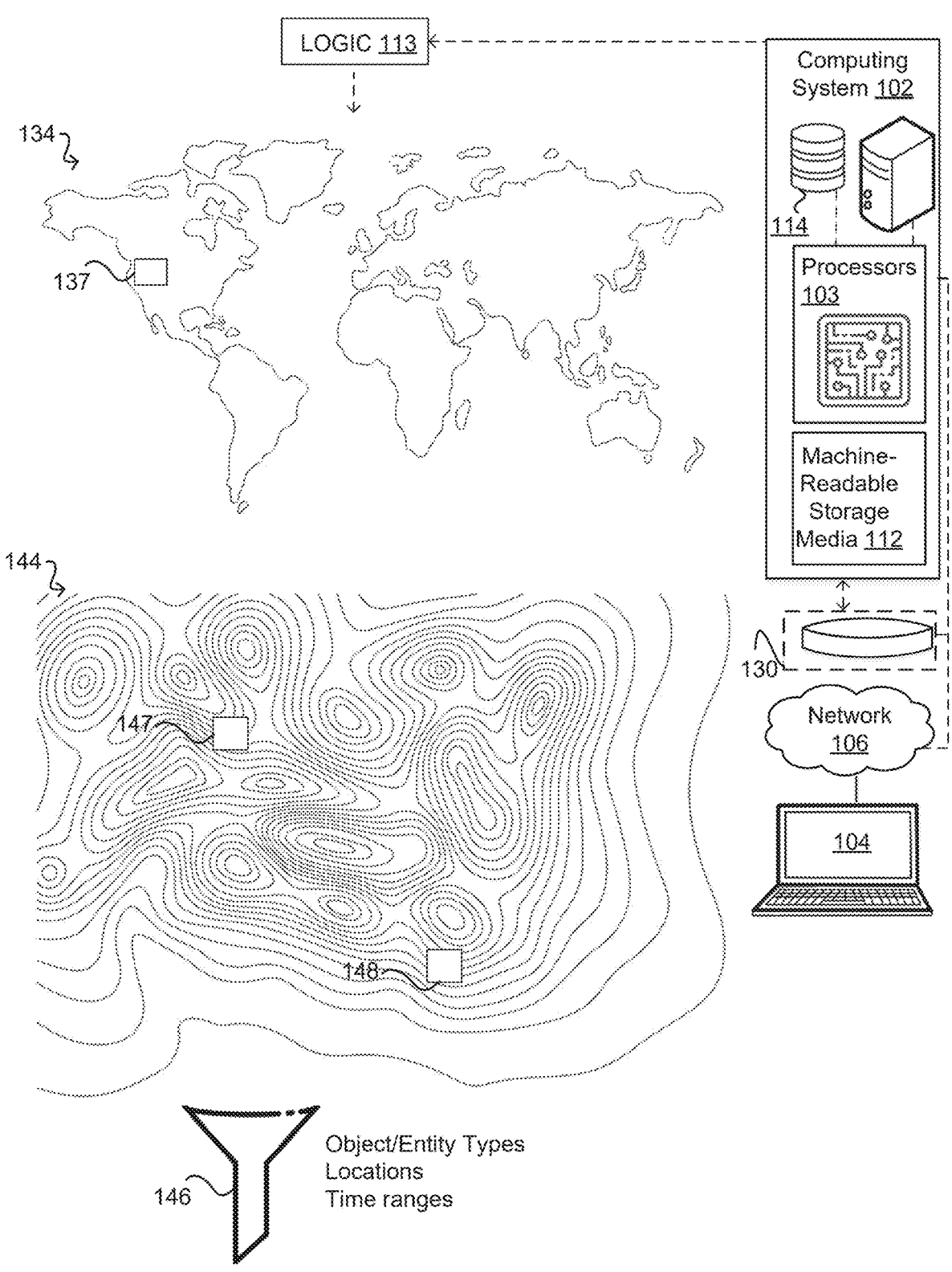

FIG. 1B illustrates that one method of receiving a query is receiving an indication or selection of a geographical area 137 within the first representation 134, or of one or more geographic areas 147 and 148 within the second representation 144, which may be implemented as any of the eight aforementioned representations, and/or any other suitable map or geospatial representation. Although the geographical area 137, 147, and 148 are illustrated as rectangular, they may be of any shape, such as a polygon or circular shape, as will subsequently illustrated geographical areas or regions. Additionally or alternatively, the query may include filter criteria 146 such as particular object or entity types (e.g., vehicles, persons, mammals, closed roads), situations or events (e.g., emergencies, traffic congestions, detours), within particular location and/or time ranges. Additionally or alternatively, the query may also include locations (e.g., cities, counties, states, provinces). One specific example of a query for a location may have a search criteria of particular conditions gathered by sensor data, such as, all locations within a particular temperature range, range of wind speeds, and/or having a certain traffic density.

Thus, the logic 113 may, upon receiving the indication or selection of the geographical area 137, 147, and/or 148, search geospatially for point (e.g., entity), line (e.g., features having at least partially open boundaries such as roads), and/or polygon (e.g., features having closed boundaries such as cities or counties) data within a map representation such as the first representation 134 or the second representation 144, and/or search for features based on criteria within the filter criteria 146. The search may be based on one or more matches within the ontology 169. For example, the logic 113 may determine geographic coordinates corresponding to boundaries and/or corners of the geographical area 137, 147, and/or 148. The logic 113 may retrieve any entities associated with geographic coordinates within the geographical area 137, 147, and/or 148, from the ontology 169. The logic 113 may further filter the retrieved entities to extract only the retrieved entities that match or satisfy the filter criteria 146. Therefore, from the ontology 169, the logic 113 may determine one or more matches or results corresponding to the indication or selection of the geographical area 137, 147, and/or 148, while determining attributes or parameters of the one or more matches or results from the ontology 169. One or more of the attributes or parameters may be selectable for revealing additional information and/or performing one or more further operations. Additionally, the logic 113 may determine one or more related entities that are related or connected to the one or more matches or results, and further determine or predict a degree of proximity between the one or more related entities and the one or more matches or results.

The logic 113 may display information of results of the search, and save the search, or the results of the search, as a template or a layer. In some examples, a template may encompass results that include all objects of a specific type prior to a filtering operation, such as, all power plant facilities on a map.

Figure 1C:
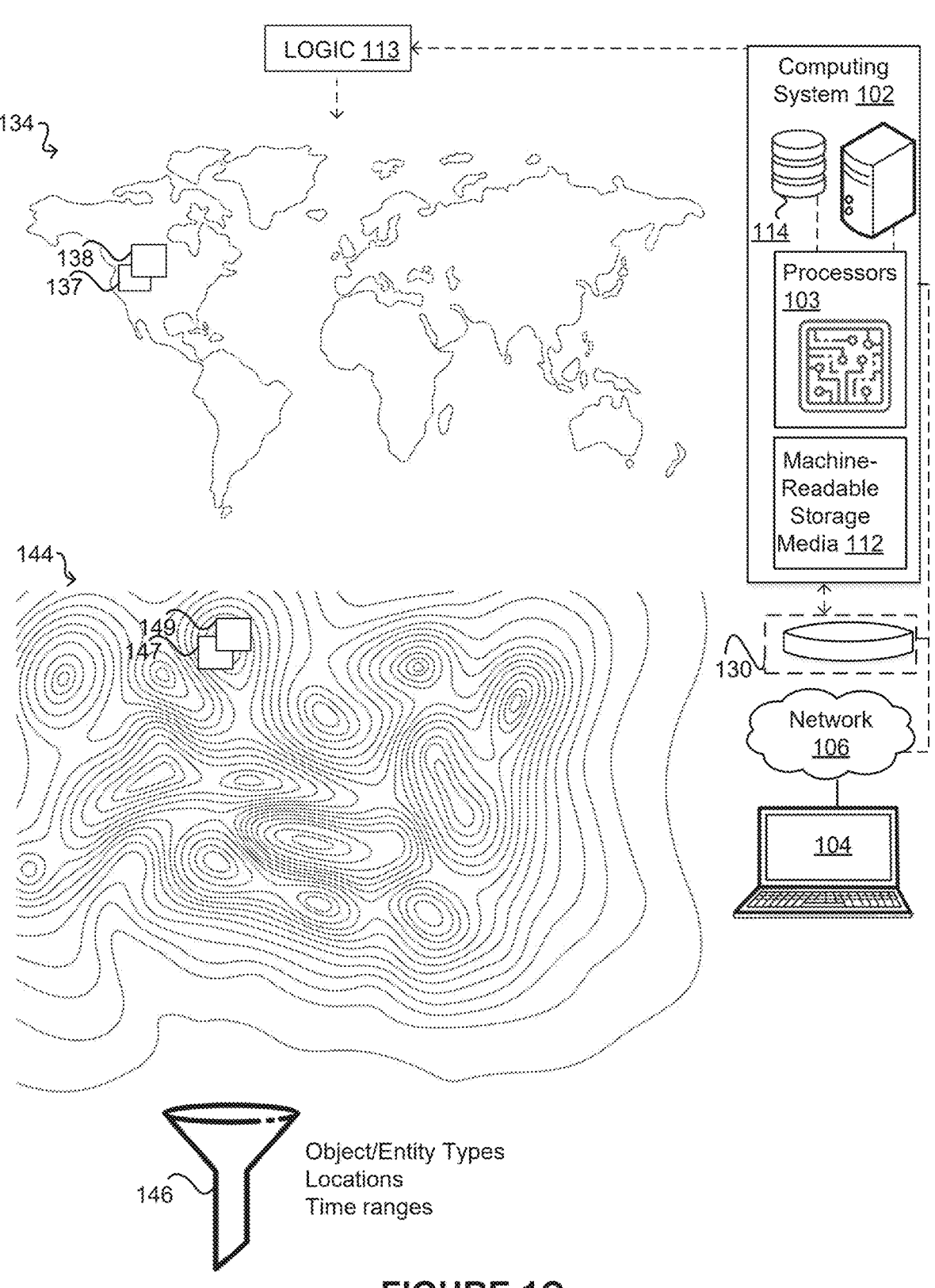

FIG. 1C illustrates that one method of receiving a query is by a polygon intersection query, which may encompass receiving an indication or selection of multiple geographic areas 137 and 138 within the first representation 134, e.g., by drawing a bounding box using any suitable method around said multiple geographical areas, or of multiple geographic areas 147 and 149 within the second representation 144 in the same manner, and searching within a region in an intersection of (e.g., that belongs to both of) the multiple geographic areas 137 and 138, or within the multiple geographic areas 147 and 149. The logic 113 may search, obtain results of the search, and/or display information of the results of the search, in a same or similar manner as described in FIG. 1B, which may include display of selectable attributes or parameters for revealing additional information and/or performing one or more further operations.

Figure 1D:
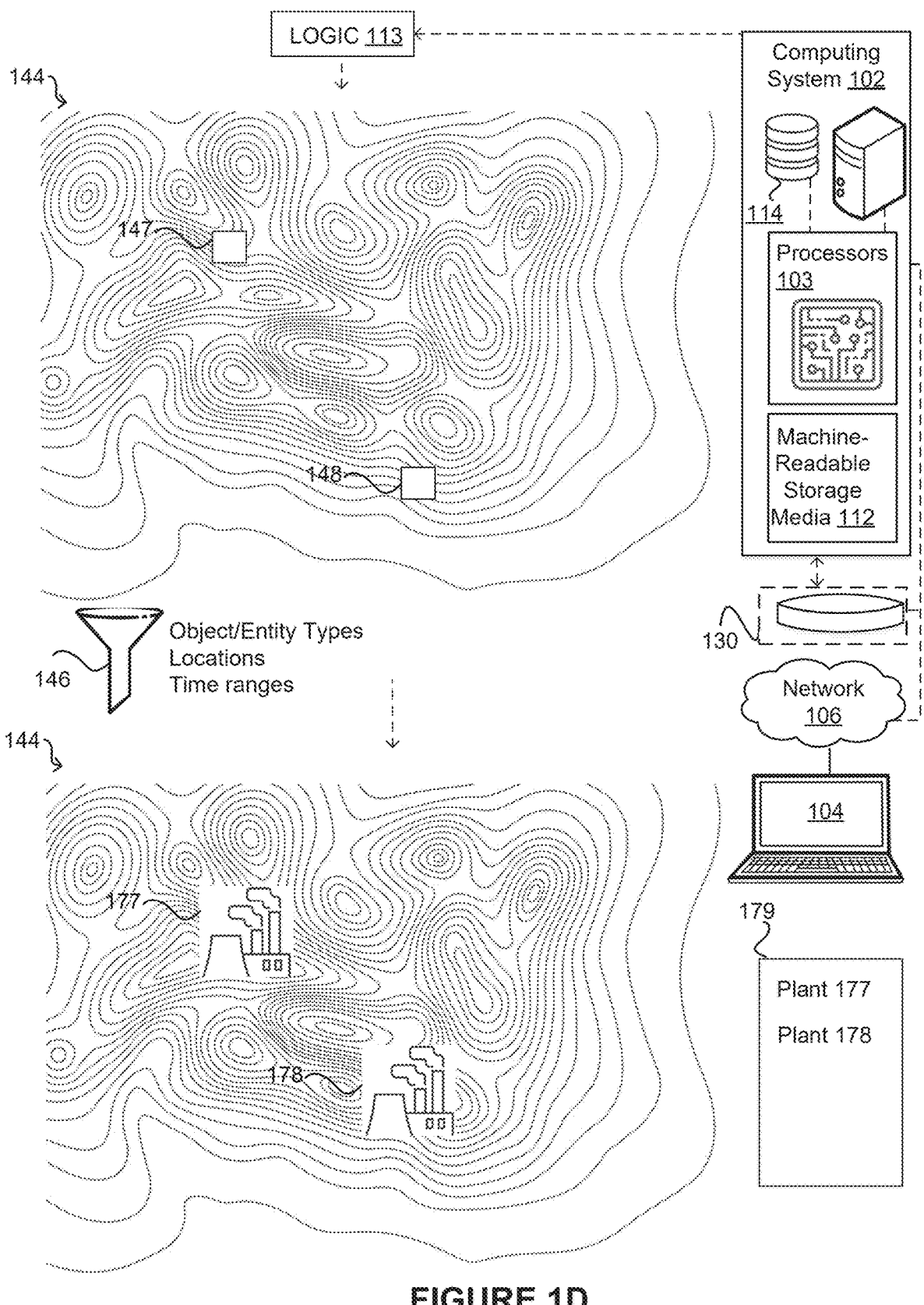

FIG. 1D illustrates one method of display of results from a query as illustrated in FIG. 1B. If the query in FIG. 1B specified, as the filter criteria 146, a specific type of facility such as a plant located within the regions 147 and 148 of the second representation 144, the logic 113 may return plants 177 and 178, and overlay the plants 177 and 178 as an additional layer onto the second representation 144. In some examples, the plants 177 and 178 may be displayed as points, and any related objects or entities may be connected to the plants 177 and 178 via a line. In some examples, the logic 113 may receive a selection of, or an indication to select, objects or entities overlaid onto the second representation 144, such as, the plant 177 or the plant 178. Upon receiving such selection or indication to select, the logic 113 may render or display any objects or entities that intersect with (e.g., are at a same location with, and/or contact) the selected objects, here, the plant 177 or the plant 178. The objects or entities that intersect with the selected objects may be determined at, or filtered based on, a current time or a historical point in time, or range of times. The logic 113 may further generate a list 179 which enumerates any objects or entities that are encompassed within the results. The objects or entities that intersect with the selected objects may be determined at, or filtered based on, a type, size, and/or other characteristic. In some examples, the logic 113 may invert the selection, meaning that any objects currently selected would be no longer selected and any currently unselected objects would become selected.

Figure 1E:
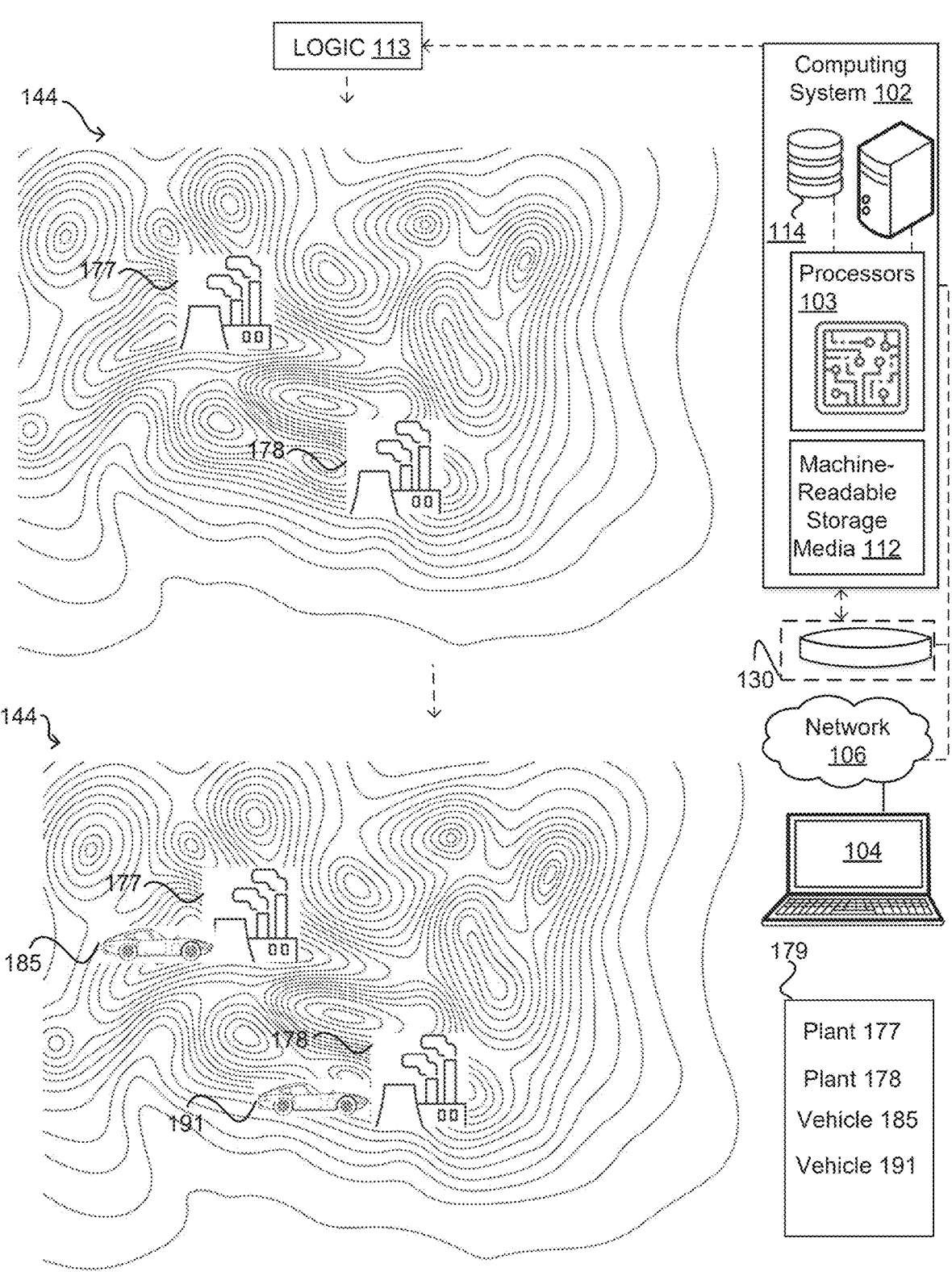
Figure 1F:
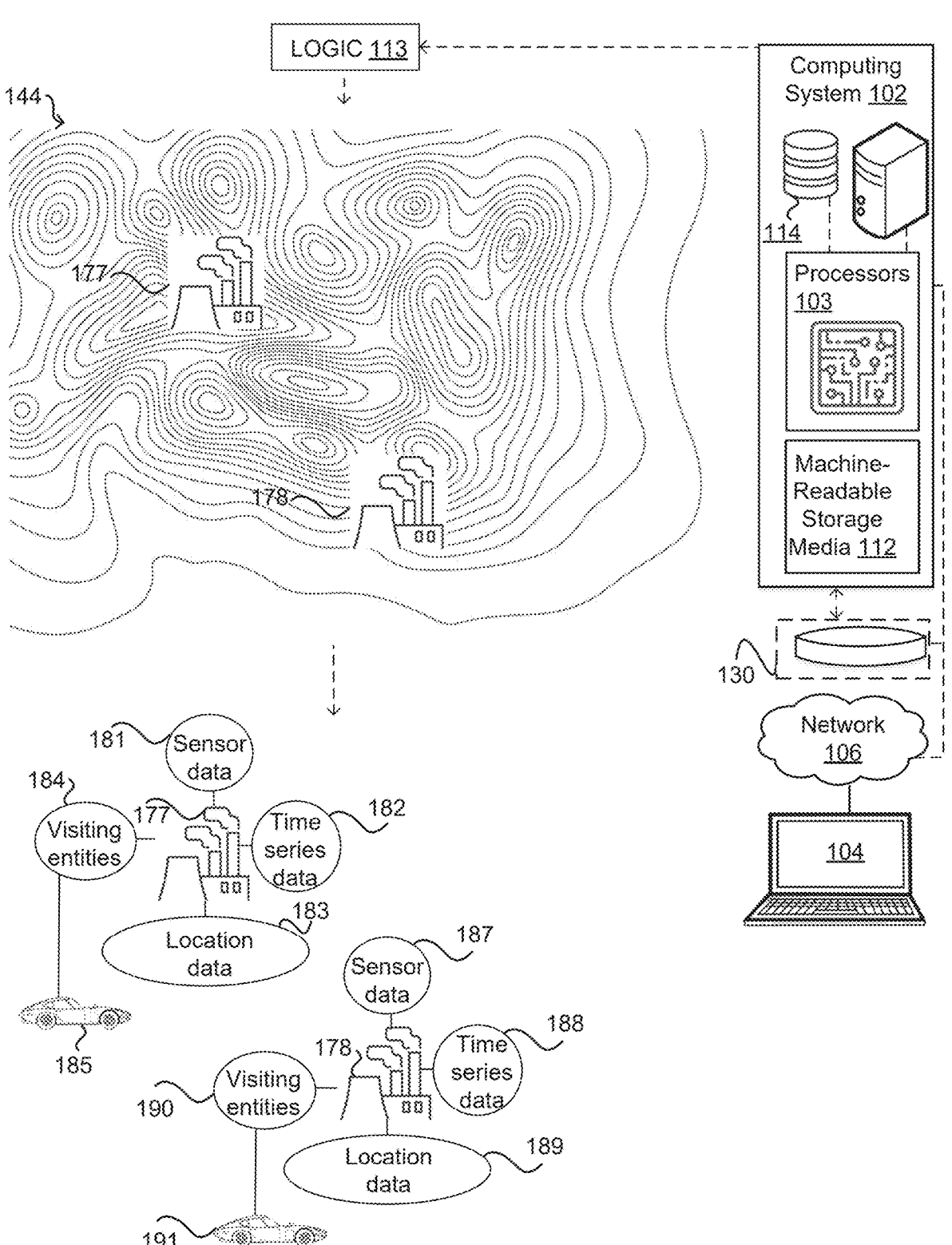

FIG. 1E illustrates the rendering or displaying of any objects or entities that intersect with (e.g., are at a same location with, and/or contact) the selected objects. Here, the logic 113 may determine that the vehicle 185 intersects the plant 177 and that a vehicle 191 intersects the plant 178, at a specified range of times. The logic 113 may further render the vehicle 185 and the vehicle 191 as an overlay onto the second representation 144. In some examples, the vehicles 185 and 191 may be displayed as points, and/or may be connected to the plants 177 and 178 via a line. The list 179 may further be updated with the selected objects.

In some examples, the logic 113 may render or display additional information regarding the objects returned by the query, either as an overlay or adjacent to the second representation 144. The additional information may include selectable information for revealing additional information and/or for performing one or more operations. For example, in FIG. 1F, the logic 113 may render or display ontological data regarding the plant 177 and/or the plant 178. The ontological data may include attributes. These attributes may include or refer to sensor data 181 such as temperature, pressure, wind speed, and/or other environmental conditions within or surrounding the plant 177. These attributes may, additionally or alternatively, include time series data 182 of the plant 177. The time series data 182 may include, conditions such as facility conditions and sensor data measured over a range of times, at previous times and a current time. The time series data 182 may be leveraged, for example, if a query required determining identities and/or locations of facilities that experienced a common event, and/or had a common range or conditions or sensor data, over a common window or range of times. These attributes may, additionally or alternatively, include location data 183 including coordinate data. These attributes may, additionally or alternatively, include visiting entities 184, such as people, vehicles, or other entities that were at a common location or range of coordinates as the plant 177, within a specified time window. The ontological data regarding the plant 177 may further include a type and/or identity of the plant 177, a current status of the plant 177, and/or a duration or lifetime of the plant 177. Similarly, the attributes of the plant 178 may include sensor data 187, time series data 188, location data 189, and/or visiting entities 190, which may include the vehicle 191.

Figure 1G:
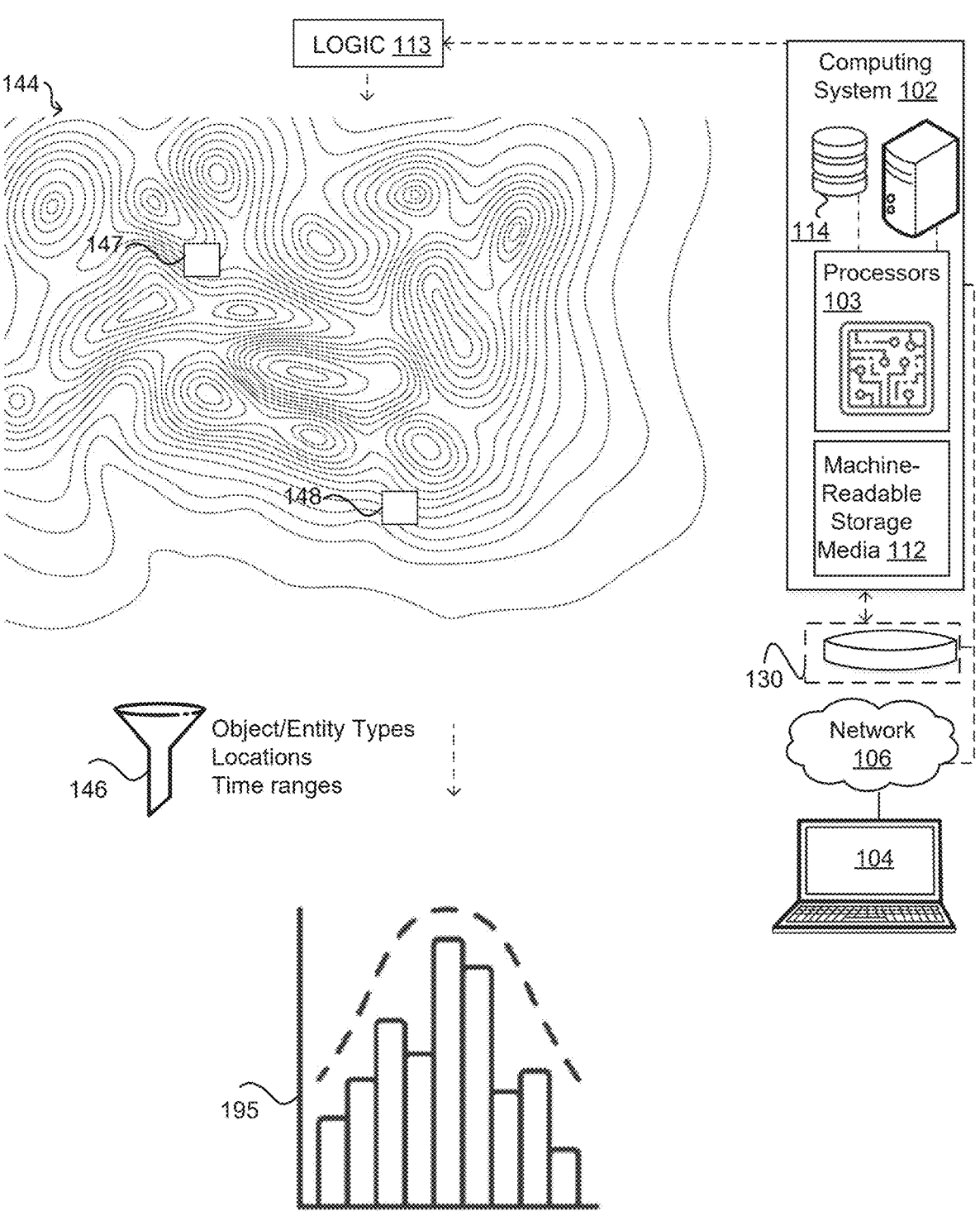

In FIG. 1G, the logic 113 may render or display statistical data regarding results or a subset thereof, generated from a query which includes the filter criteria 146. This statistical data may be rendered as an overlay or at a side of the second representation 144. In particular, the logic 113 may generate a statistical representation 195 such as a histogram. For example, the statistical representation 195 may indicate counts of entities within the results that fit in different categories, and/or have different characteristics or ranges thereof. These different categories may include types, classifications, or subclassifications of facilities, and counts of facilities that were returned as matches to the query that fall in each of the types, classifications, or subclassifications. As another example, the statistical representation 195 may represent or depict a count of facilities within each of different temperature ranges. As another example, the statistical representation 195 may illustrate a count of active events for one or more objects. The statistical representation 195 may be in text and/or pictorial format and may be filtered based on date and/or numeric properties. The statistical representation may represent bins of ranges of vales and/or parameters. In some examples, the logic 113 may receive a selection of the statistical representation 195, or of a particular category or bin on the statistical representation 195. Upon receiving the selection, the logic 113 may display relevant metrics regarding the statistical representation 195, such as, characteristics or parameters of the statistical representation 195 organized according to date or time, and/or organized according to counts in each category or bin.

Figure 1H:
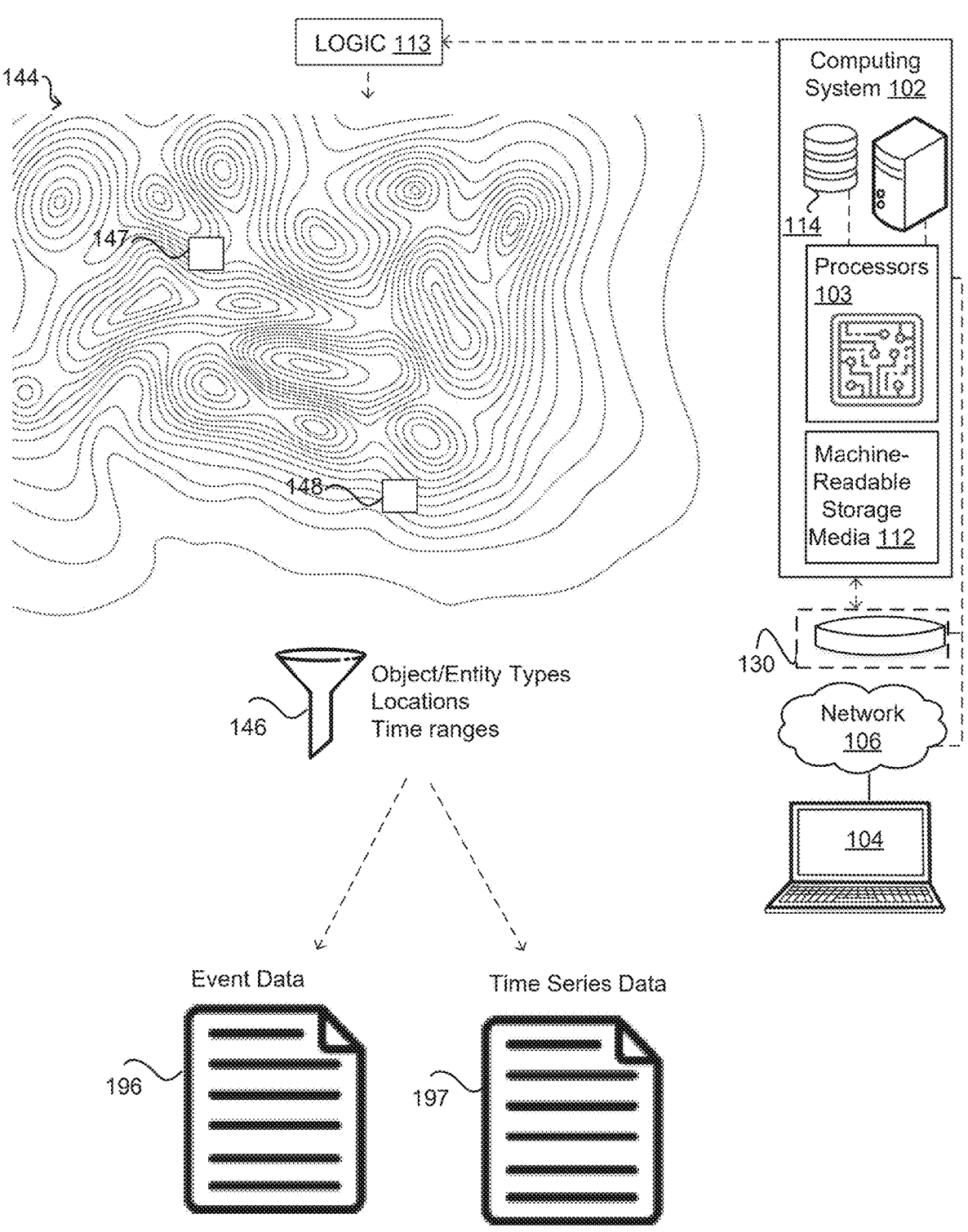

In FIG. 1H, the logic 113 may render or display event data 196 and/or time series data 197 regarding results or a subset thereof, generated from a query. For example, the time series data 197 may depict one or more characteristics or parameters over time, in the past or in the present, at the locations corresponding to the geographic areas 147 and 148, and/or one or more entities within the geographic areas 147 and 148. Meanwhile, the event data 196 may depict or indicate one or more events that occurred in the past, or is occurring in the present. The event data 196 may indicate a start time and/or an end time of an event. The event data 196 and/or the time series data 197 may be overlaid onto the second representation 144.

Additionally, the logic 113 may receive an annotation, either in text, polygon, rectangle, or circle format. The annotation may indicate contextual information. The logic 113 may provide a tooltip to receive details or parameters of the annotation. For a polygon, the logic 113 may receive an indication of all points on the polygon, including specified relative and/or absolute coordinate locations. For a rectangle, the logic 113 may receive an indication of two corners. For a circle, the logic 113 may receive an indication of a center and a radius. Given the aforementioned indications, the logic 113 may generate a corresponding annotation. In some examples, upon the logic 113 detecting a hovering action over an annotation, the logic 113 may generate a tooltip containing a title and/or details of the annotation.

In some examples, geospatial data regarding objects or entities (e.g., the entities, or the power plants 177 and 178, and/or the vehicles 185 and 191) may exist in one layer, while relationships or links among the objects may reside in a different layer, and annotations may reside in another different layer. Additionally, a customized overlay may reside in yet another layer.

Figure 2A:
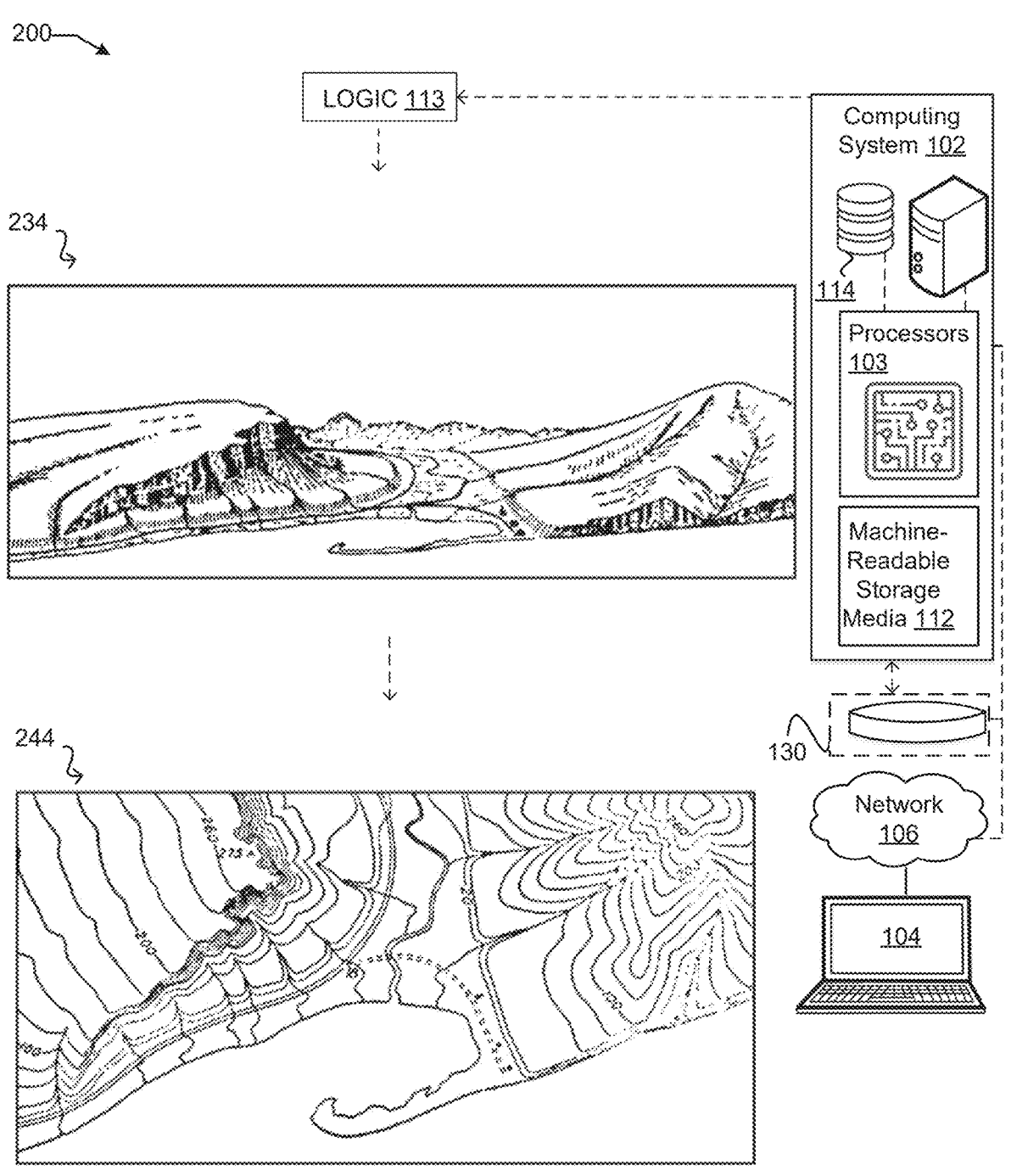
FIGS. 2A-2C illustrate 3-dimensional (3D) examples of augmenting a map representation.
Figure 2B:
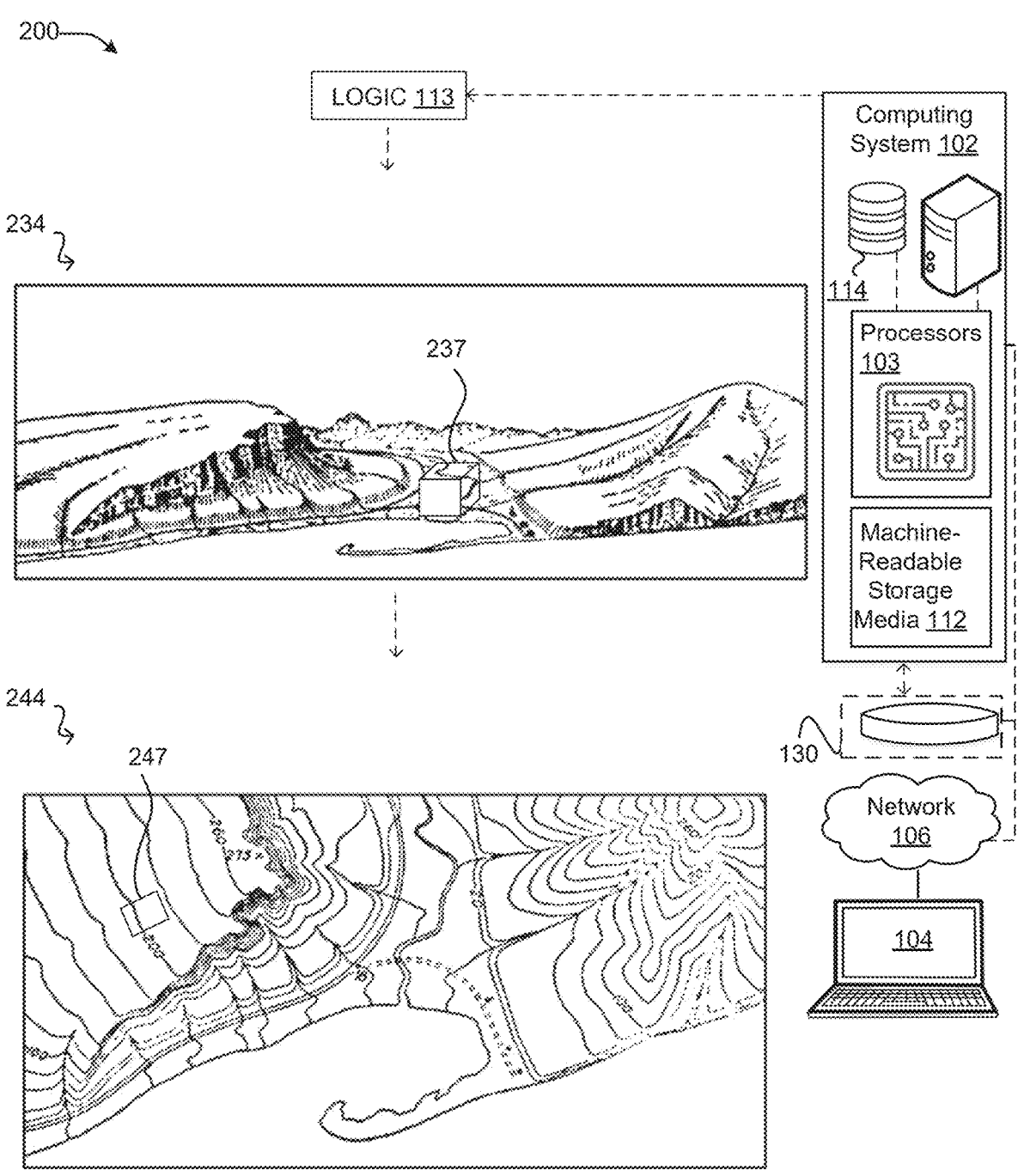
Figure 2C:
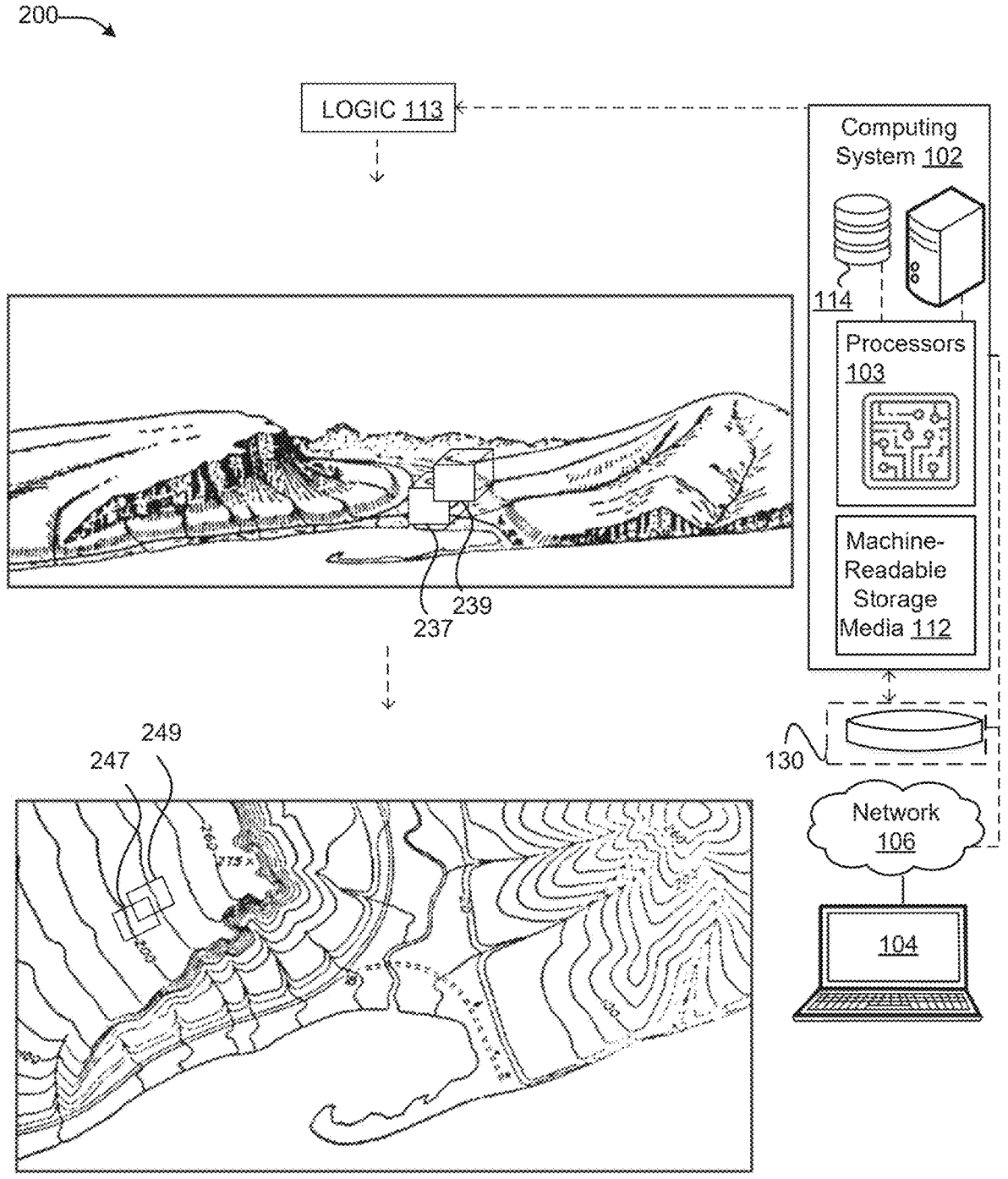

FIGS. 2A-2C illustrate an implementation of 3-dimensional (3-D) representations. For example, a first 3-D representation 234 may illustrate 3-D characteristics of a region. Meanwhile, a contour representation or a contour map 244 (hereinafter "contour representation") may illustrate segments or lines having different altitudes or elevations. In FIG. 2B, the logic 113 may receive a selection of a 3-D region 237, and/or a region 247 that spans different contour lines, and therefore, different elevations. Thus, the logic 113 may return any results within the specified range of heights, altitudes, or elevations. In FIG. 2C, the logic 113 may receive a selection of two overlapping 3-D regions 237 and 239, and return any results within, or corresponding to, a region within an intersection of the two overlapping 3-D regions 237 and 239. Similarly, the logic may receive a selection of two overlapping regions 247 and 249 and determine an intersection within the two overlapping regions 247 and 249, which may span a range of heights, altitudes, or elevations. In some examples, the logic may receive a selection of a 2-dimension (2-D) region, as in FIGS. 1A-1H, and further receive filter criteria of elevation, or z-coordinate, ranges, and thus, determine a selection of a 3-D region. Other principles depicted and illustrated in FIGS. 1A-1H may also be applicable to FIGS. 2A-2C.

Figure 3:
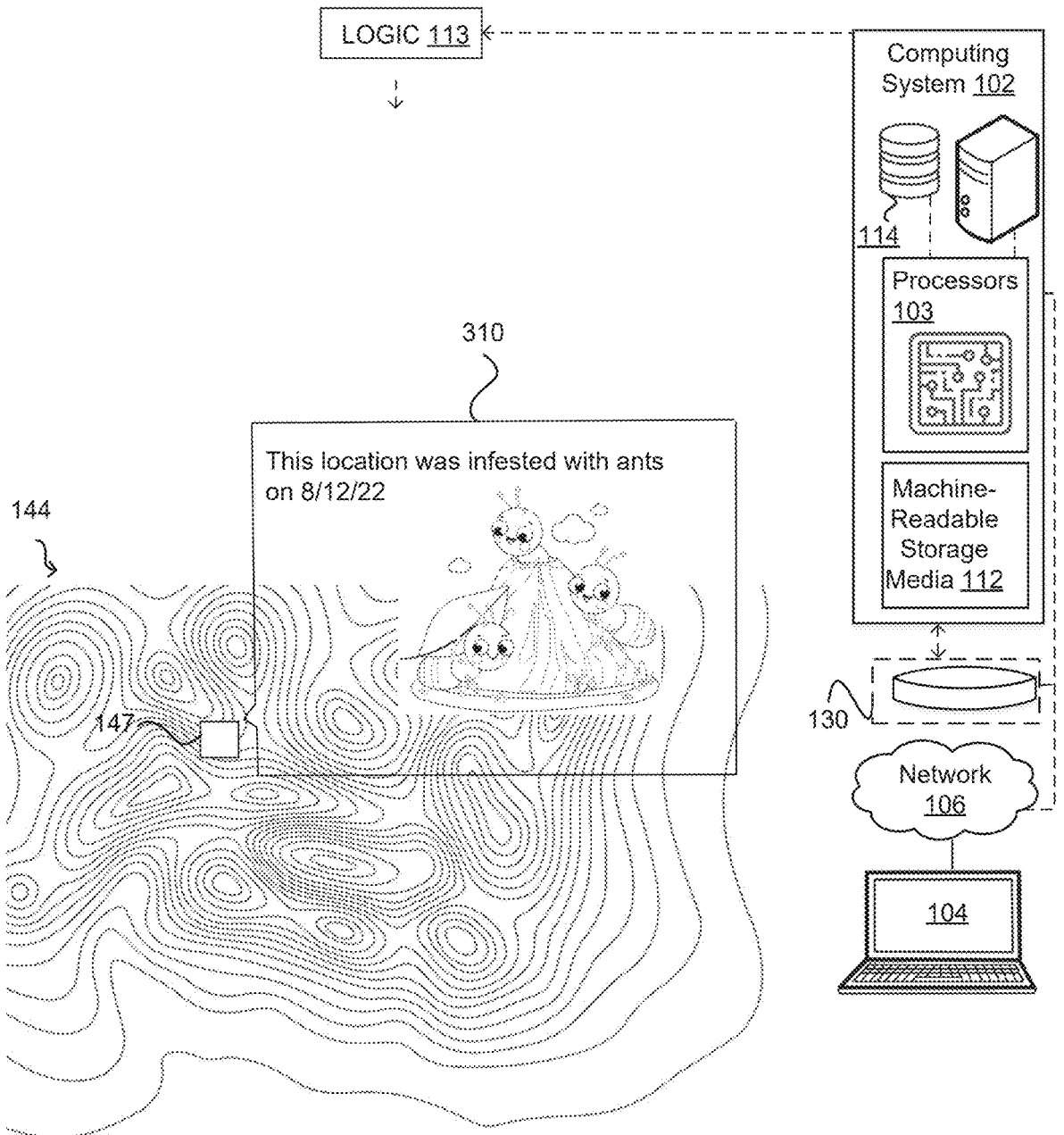
FIG. 3 illustrates a specific example of annotating a map representation, for example, a layer on a map.

FIG. 3 illustrates an implementation of an annotation or an annotation layer overlaid onto the second representation 144. The annotation may be displayed as a popup such as a tooltip 310. The annotation may be manually generated and indicate contextual information about the geographic area 147. The tooltip 310 may appear upon the logic detecting a hovering action over the geographic area 147, and/or may appear automatically. In some examples, the annotation may correspond to an entity rather than a location in a similar manner to that illustrated in FIG. 3.

Figure 4:
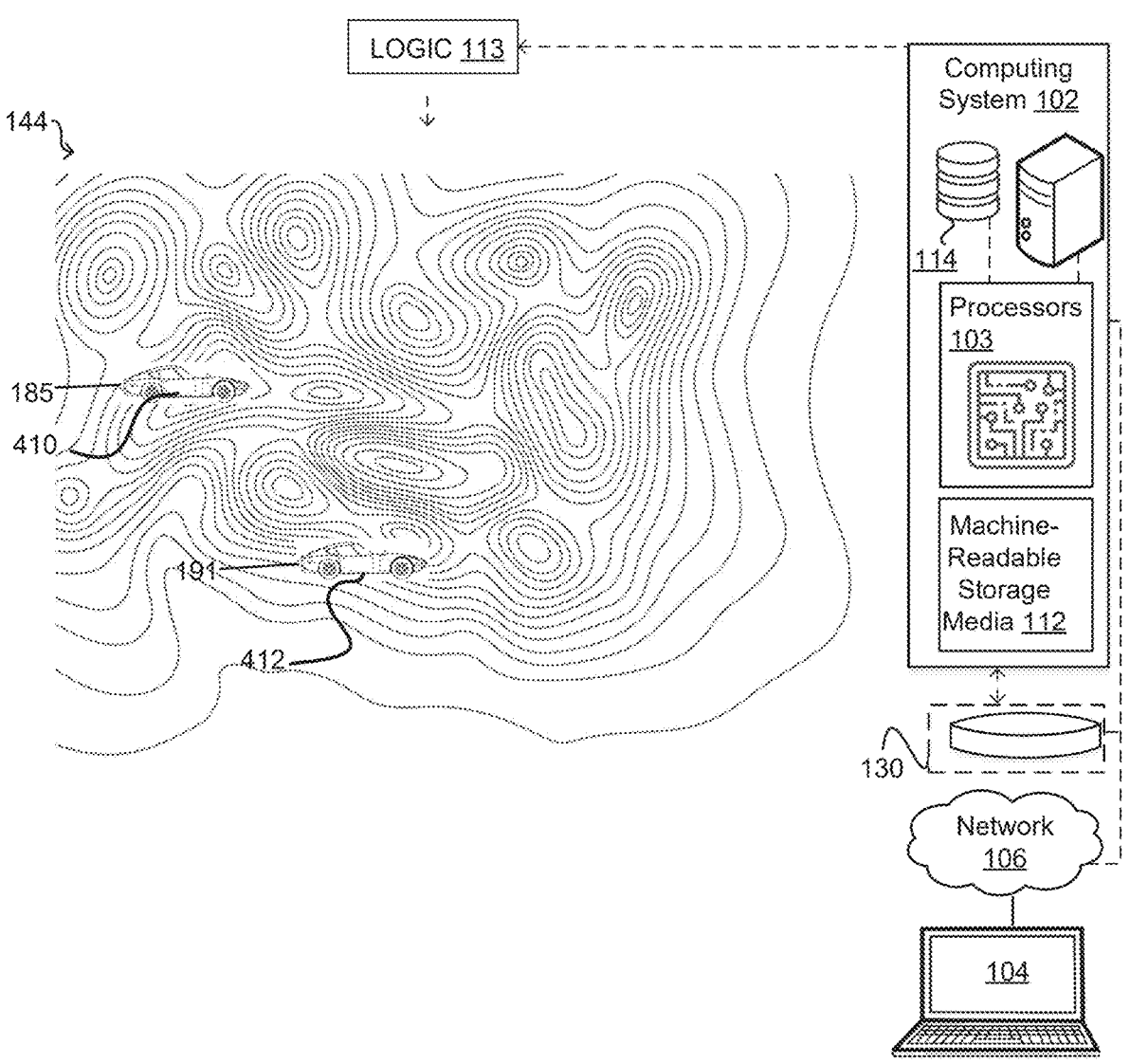
FIG. 4 illustrates a specific example of generating a path or a track indicative of a previous or current movement of an entity on a map.

FIG. 4 illustrates an implementation of a depiction of the second representation 144 being augmented with a path or track (hereinafter "track") illustrating a previous path or road traversed. The logic 113 may generate tracks 410 and 412, corresponding to the vehicles 185 and 191, respectively, based on the time series data 135 and/or the sensor data 140, which may indicate previous positions at respective times of the vehicles 185 and 191.

Figure 5:
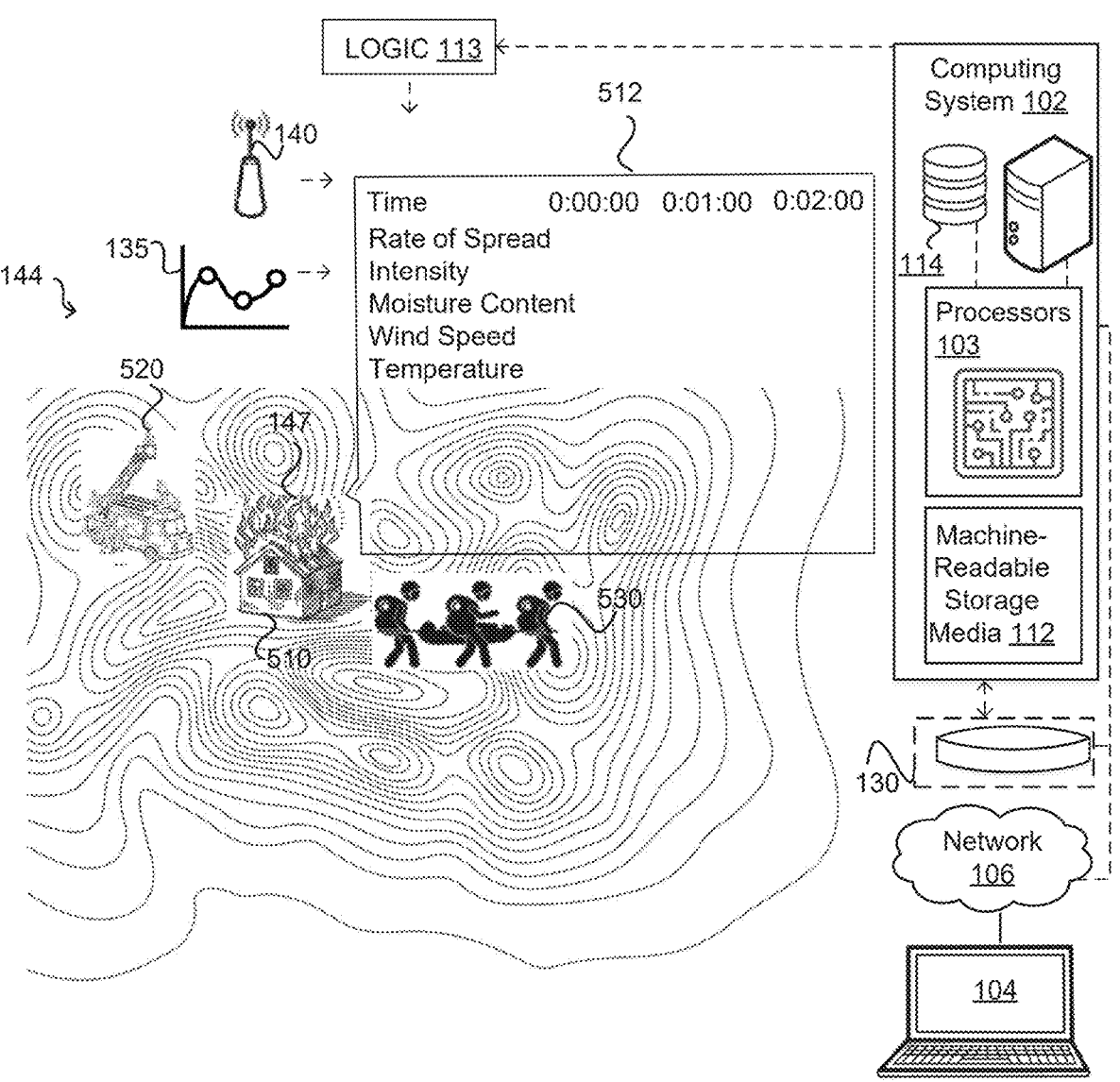
FIG. 5 illustrates a specific example of augmenting a map representation with event and sensor data, which may include time series data, using an ontology.

FIG. 5 illustrates an implementation of an overlay of the event data 135 and/or the sensor data 140. In particular, the logic 113 may determine, from the ontology 169, in response to an event query corresponding to the geographic area 147, an event 510, which may include a fire. Information regarding the fire may be further augmented from the time series data 135 and/or the sensor data 140, which may indicate characteristics or parameters of the event 510 such as a rate of spread at different times, an intensity at different times, a moisture content, a wind speed, and/or a temperature at different times. The characteristics may be displayed or overlaid within a popup such as a tooltip 512. Other related events may be determined by the logic 113 from the ontology 169, due to their temporal and/or spatial proximity to the event 510, such as rescue events 520 and 530. Thus, the second representation 144 may be augmented by event data including the event 510 as well as the rescue events 520 and 530, related to the event 510.

Figure 6:
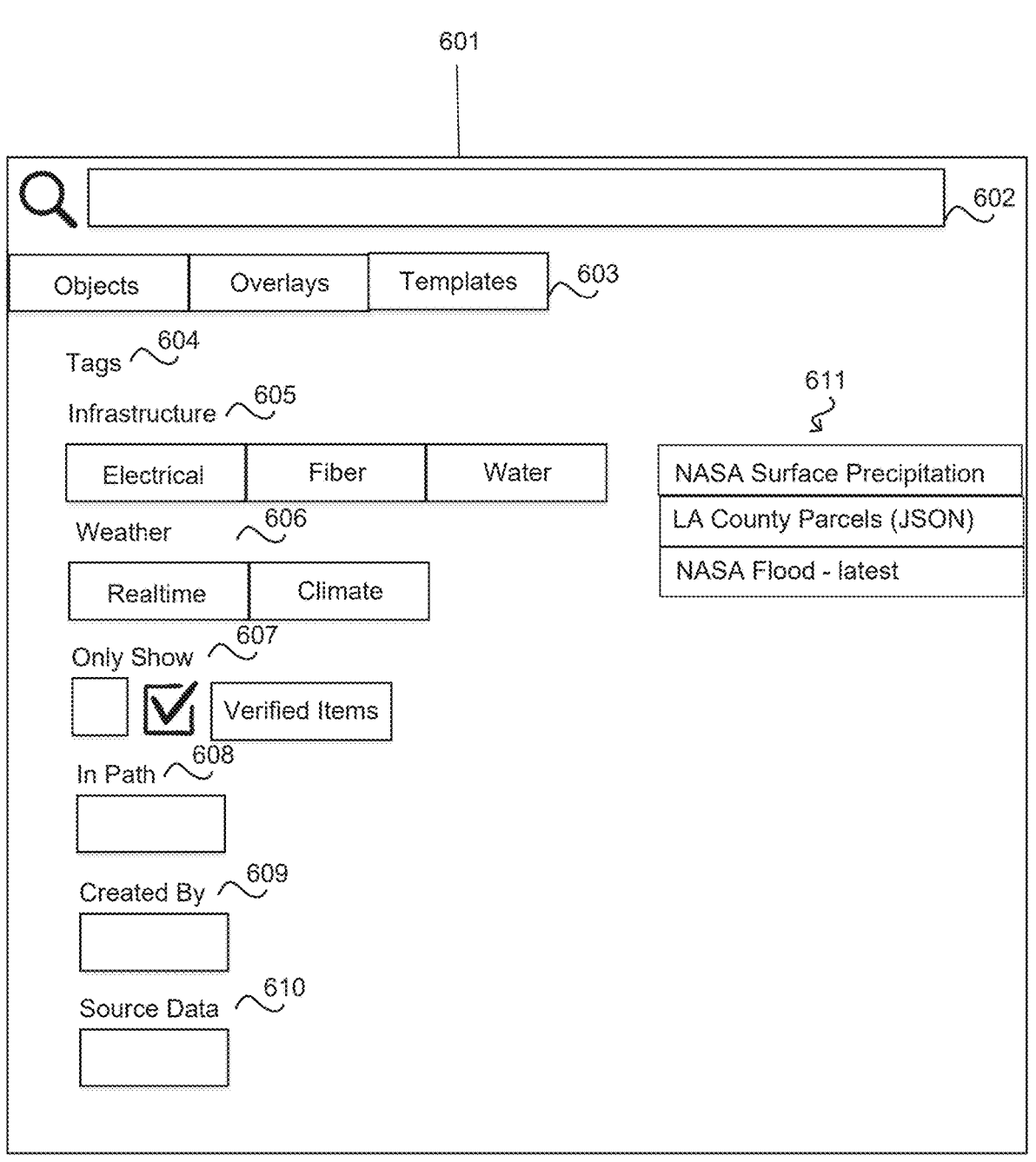
FIG. 6 illustrates a user interface.

FIG. 6 illustrates an implementation of an interface 601. The interface 601 may include a search bar or search portion 602 which may receive a search query. A tab portion 603 may display or populate different pictorial representations and/or text information of results, depending on whether "objects," "overlays," or "templates" is selected. In some examples, a selection of "objects" may result in depiction of any objects satisfying further filter criteria, for example, specified by the tags 604, which may include categories of infrastructure 605, and/or of weather 606, a selection bar 607 that includes further selection criteria, a path 608 indicating a folder or file in which underlying data of the results belongs to, a source 609 that created the underlying data, and/or an original source 610 of the source data, such as a particular sensor or particular analysis mode that obtained the data. In some examples, a selection of "overlays" may result in depiction of customized overlays such as background features for a mapping representation (e.g., the second representation 147). In some examples, a selection of "templates" may result in a mapping representation that has been augmented by a particular category of object, and to which further filtering may be applied. The interface 601 may further list specific customized overlays 611 including a source, type, nature, and/or version of each customized overlay.

Figure 7:
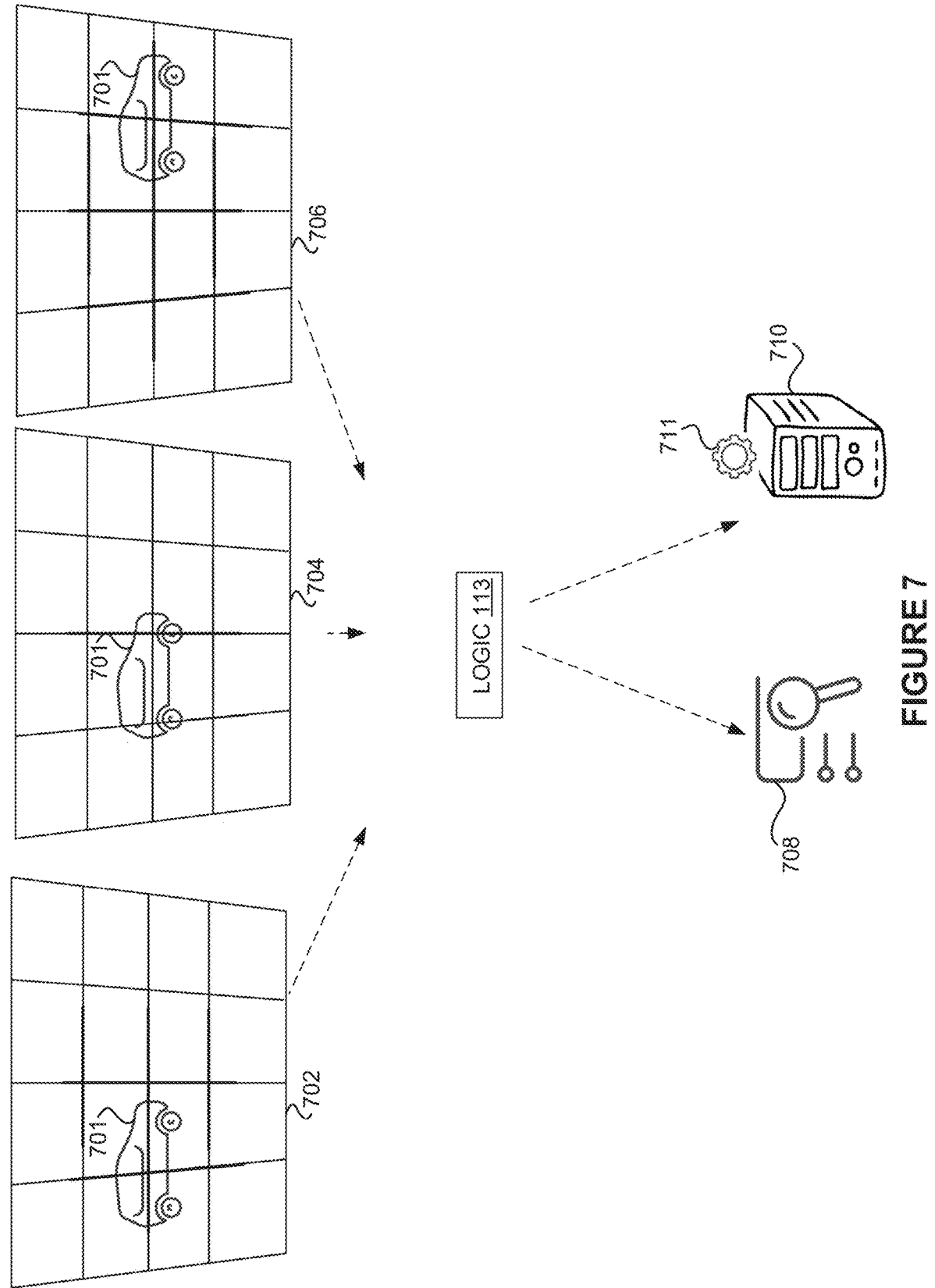
FIGS. 7-10 illustrate downstream practical applications.

FIG. 7 illustrates a downstream action to be performed following the augmentation of a map representation, as illustrated, for example, in FIGS. 1A-1H, 2A-2C, and 3-5. In particular, further operations using the augmented map representation may be performed, such as feature extraction, feature analysis, direct measurement, and/or other transformations. As specific, non-limiting examples, these further operations may include extracting and/or tracking entities over time. These entities may be either static or dynamic. As a result of the incorporation of time series data and sensor data, precise and/or accurate locations, orientations, velocities, accelerations, and/or other parameters of an entity may be obtained and displayed over time, with respect to geographic positions or coordinates. Therefore, identification of a particular entity and/or a feature of a particular entity may be elucidated.

Other downstream actions that may be performed, additionally or alternatively, may encompass coordinating, planning, and/or executing an action to be performed with respect to a tracked entity, such as transmitting a message or signal to the entity (e.g., to stop or slow down travel, move in a certain direction and/or a certain velocity or acceleration, or to synchronize movement with another entity), transmitting information regarding the entity or parameters thereof to another device or computer, blocking, restraining, and/or restricting further movement of the entity, or triggering an alarm regarding the entity. In some examples, the logic 113 may delegate one or more tasks to a different computing system in response to detecting certain conditions. As a particular example, aforementioned location, orientation, velocity, and/or accelerations of the entity may be obtained for a specified duration. If one or more specific parameters or characteristics of the entity, such as the aforementioned location, orientation, velocity, and/or accelerations, are outside of some threshold value or range, then additional monitoring and/or analysis of the entity may be undertaken or performed. This additional monitoring may be performed at higher frequency of capture, or capture rate, and/or at a higher capture or imaging resolution than previously. For example, images, video, and/or other media of the entity may be captured at a higher frequency, such as, from 1 Hz or one time per second to 2 Hz or two times per second. Additionally or alternatively, the parameters previously measured may be measured at a higher frequency, and/or additional parameters not previously measured may be measured.

As illustrated in FIG. 7, a captured entity 701 in sequential media frames 702, 704, and 706 may be fed into the logic 113. If the logic 113 detects that certain parameters or characteristics of the captured entity 701 deviate from threshold ranges or levels, historical parameters or characteristics, or historical changes in the parameters or characteristics of the captured entity 701, and/or historical changes in entities of similar or same types as the captured entity 701, then the logic 113 may perform additional monitoring 708 and/or transmit instructions or protocols to a different computing component 710, for example, via an application programming interface (API) 711 to perform some action. The logic 113 may also perform some action on its own. Such an action may include, as explained above, outputting an alert or flag to the captured entity 701 or to another entity regarding movements or activities of the captured entity 701, controlling or coordinating an action or movement of the captured entity 701, and/or deploying or coordinating a strategy or action in response to the captured movements or activities of the captured entity 701. In some examples, the logic 113 may determine a particular action to perform depending on an extent to which a threshold is exceeded, which may indicate a severity or potential severity of a situation. For example, if a threshold is exceeded by a first amount, then the logic 113 may perform outputting an alert. However, if the threshold is exceeded by a second amount, then the logic 113 may perform deploying or coordinating a strategy or action.

The parameters or characteristics may be associated or relate to geographic coordinates of the captured entity 701. For example, between the media frames 704 and 706, the logic 113 may detect that a change in geo-coordinates of the captured entity 701 deviates from a threshold range of changes over a specific time interval. Parameters and/or characteristics of the captured entity 701 may be logged in the database 130 so that historical parameters or characteristics may be constantly updated to establish and update baseline or threshold levels.

Figure 8:
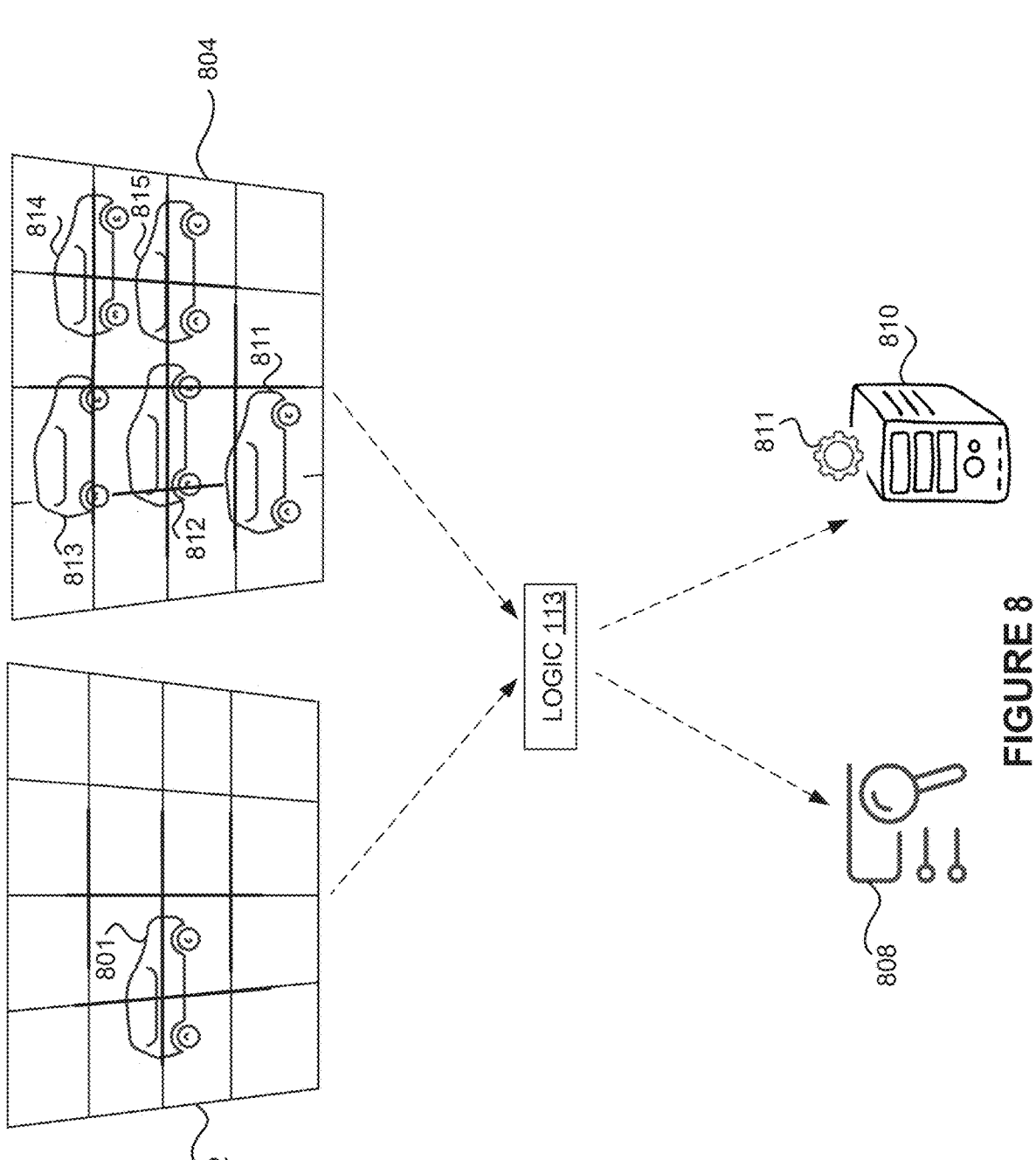

In FIG. 8, the logic 113 may determine to perform some downstream action in response to a concentration or number of entities, or a change of the concentration or number of entities within a specified time interval, within a particular range of geolocations satisfying some threshold (e.g., a minimum or a maximum threshold). For example, the logic 113 may determine that either a concentration of entities in a media frame 802, which contains only one entity 801 of a specified type, does not satisfy a threshold. However, in a subsequent media frame 804, the logic 113 may determine that a number or concentration of entities 811, 812, 813, 814, and 815 of the specified type satisfies a threshold. Additionally or alternatively, the logic 113 may determine that a rate of change of the concentration of entities 811, 812, 813, 814, and 815 from the media frame 802 to the subsequent media frame 804 satisfies a threshold rate of change. Thus, following the subsequent media frame 804, the logic 113 may perform additional monitoring 808, transmit instructions or protocols to a different computing component 810, for example, via an application programming interface (API) 811 to perform some action, and/or perform some action itself.

Figure 9:
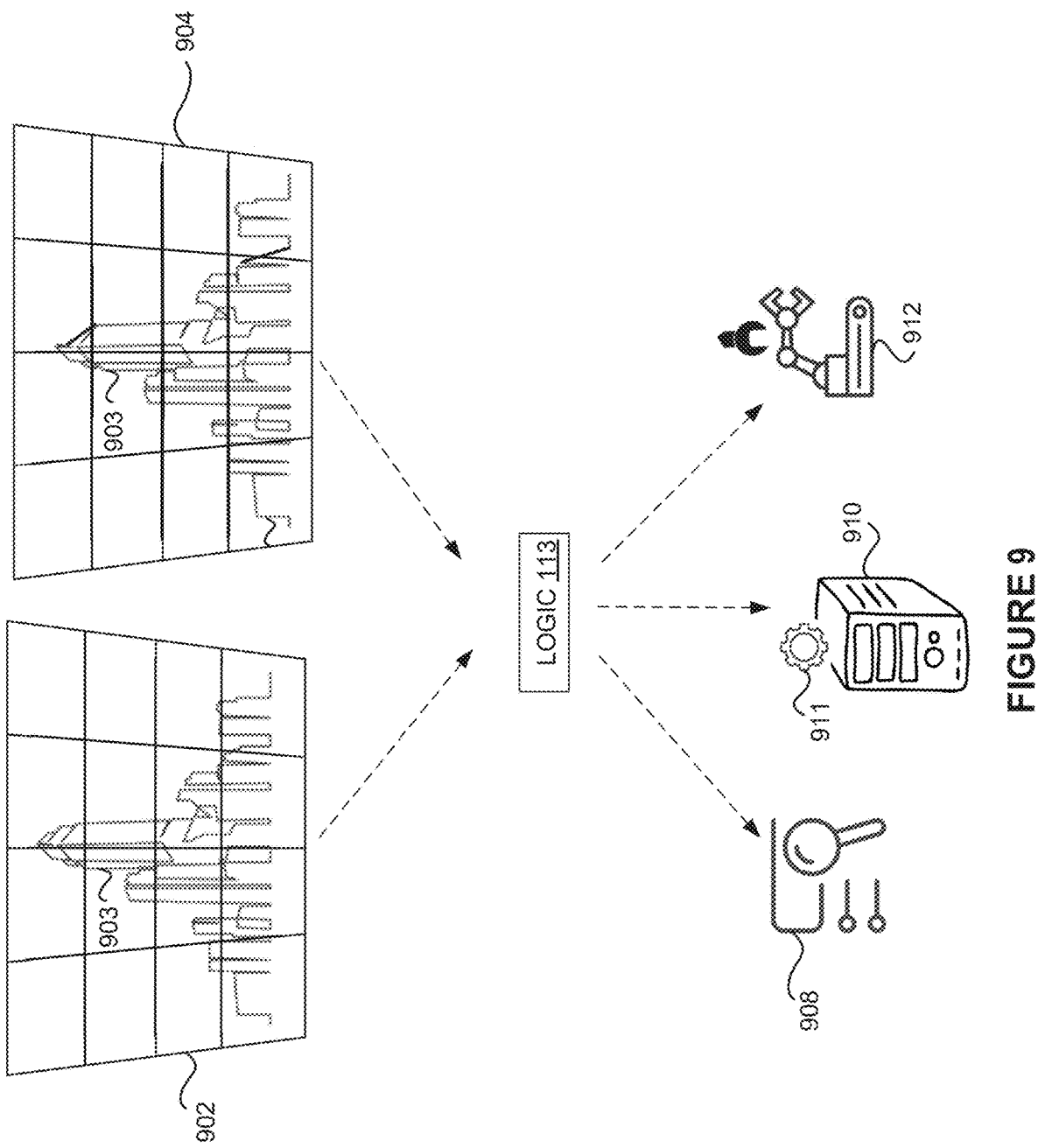

In FIG. 9, the logic 113 may determine to perform some downstream action in response to a change in an entity 903 over sequential media frames 902 and 904. Although only two sequential frames are illustrated for the sake of brevity, the logic 113 may make a determination of a downstream action to perform based on more than two media frames. Here, the logic 113 may comprise a static, or primarily static entity, such as a structure. For example, if a parameter or characteristic of the logic 113 changes, at one or more specified geo-coordinates, and/or over a range of geo-coordinates, over time, by more than a threshold amount or rate, then the logic 113 may perform additional monitoring 908, transmit instructions or protocols to a different computing component 910, for example, via an application programming interface (API) 911 to perform some action, and/or perform some action itself. This action may encompass a maintenance and/or repair operation 912. In FIG. 9, the entity 903 may be tracked to determine whether certain portions of it fall apart or become dilapidated.

Figure 10:
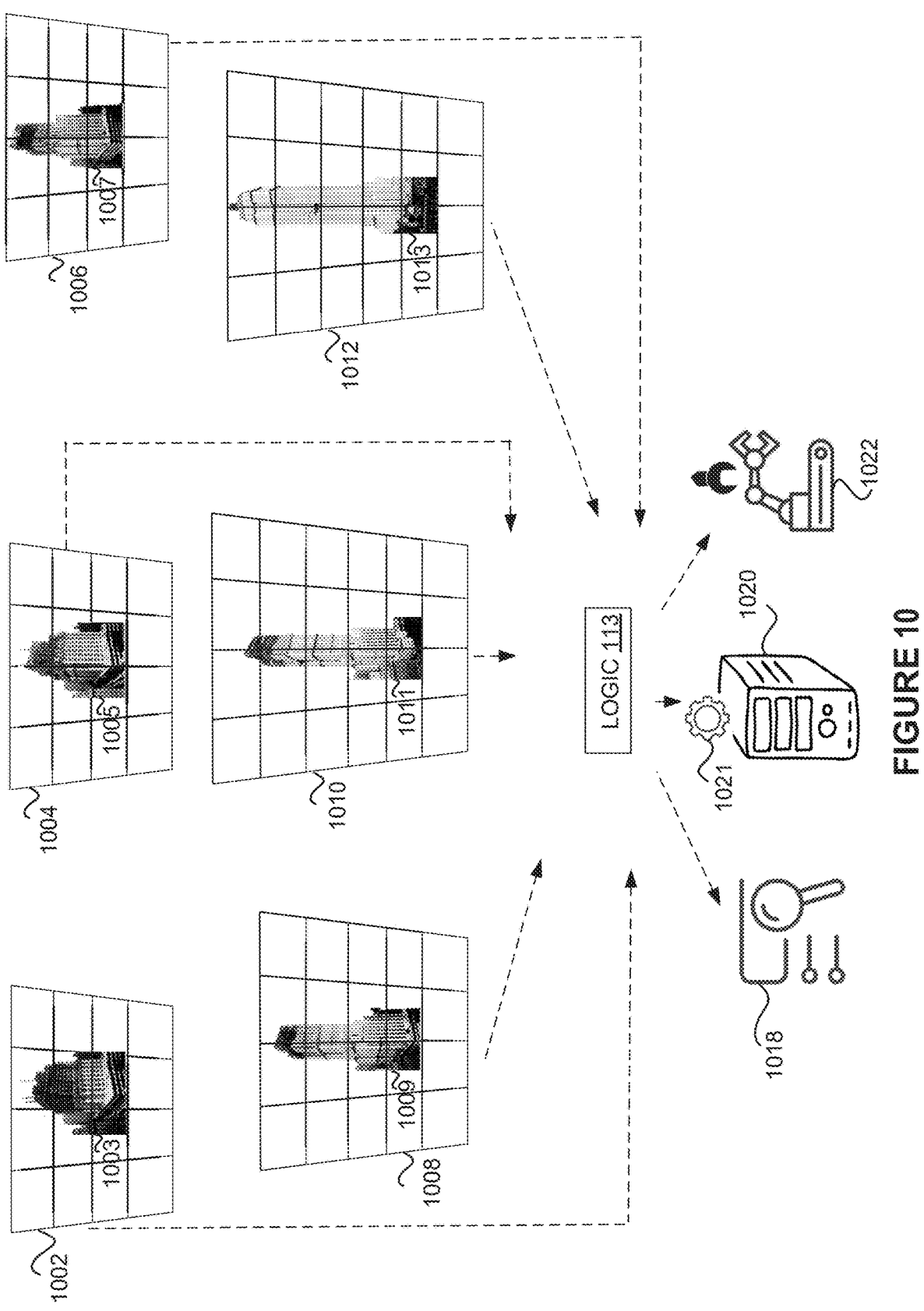

In FIG. 10, the logic 113 may determine to perform some downstream action in response to a change in an entity over sequential media frames 1002, 1004, 1006, 1008, 1010, and 1012. Corresponding to the sequential media frames 1002, 1004, 1006, 1008, 1010, and 1012, an entity may be at a first stage 1003, a second stage 1005, a third stage 1007, a fourth stage 1009, a fifth stage 1011, and a sixth stage 1013. If, between any two successive stages, the logic 113 determines that a rate of change falls outside of some threshold range, then the logic 113 may determine to perform some downstream action. For example, the entity at the different stages may be undergoing construction. The logic 113 may detect if the construction is progressing too slowly, for example, by detecting one or more changes and/or rates of change at a particular geo coordinates and/or over a range of geo-coordinates over time. Here, the downstream action may constitute additional monitoring 1018, transmit instructions or protocols to a different computing component 920, for example, via an application programming interface (API) 1021 to perform some action, and/or perform some action itself. This action may encompass a maintenance, construction, and/or repair operation 1022.

FIG. 11 illustrates a flowchart of an example method of georeferencing stabilization, in accordance with various embodiments of the present technology. A method described in the flowchart may be implemented in various environments including, for example, the implementation 100 of FIGS. 1A-1H, within FIG. 2A-2C, FIG. 3, FIG. 4, and/or FIG. 5. FIG. 11 illustrates a computing component 1100 that includes one or more hardware processors 1102 and machine-readable storage media 1104 storing a set of machine-readable/machine-executable instructions that, when executed, cause the hardware processor(s) 1102 to perform an illustrative method of georeferencing stabilization. It should be appreciated that there can be additional, fewer, or alternative steps performed in similar or alternative orders, or in parallel, within the scope of the various embodiments discussed herein unless otherwise stated. The computing component 1100 may be implemented as the computing system 102 in FIGS. 1A-1H, for example. The hardware processor(s) 1102 may be implemented as the processors 103 in FIGS. 1A-1H, for example The computing component 1100 may include a server. The machine-readable storage media 1104 may include suitable machine-readable storage media described in FIG. 12, and/or may be implemented as machine-readable storage media 112 in FIGS. 1A-1H, for example.

As shown in FIG. 11, the method may include step 1106 for obtaining or generating a map representation (e.g., the first representation 134 or the second representation 144).

The method may further include step 1108 for obtaining event data from an external source at a location corresponding to the map representation. The event data may indicate, for example, a movement of an entity such as a vehicle or a human, or a disaster or other natural event occurring.

The method may further include step 1110 for obtaining sensor data from an external sensor, the sensor data including time series data. For example, the sensor data may indicate parameters or characteristics over time, pertaining to, or of the event associated with the event data. For example, the sensor data may indicate any of the parameters illustrated in the tooltip 512 of FIG. 5, and/or other parameters such as velocity, acceleration, or other movement properties or changes of an entity. The event data and the sensor data may have been written into an ontology (e.g., the ontology 169) and/or stored in the database 130 and/or the cache 114.

The method may further include step 1112 for mapping the event data to the sensor data according to an ontology (e.g., the ontology 169). The mapping of the event data to the sensor data may specifically map a geospatial and/or temporal relationship between the event data and the sensor data, as indicated by the sensor data 140 and the time series data 135, for example.

The method may further include step 1114 for receiving a query pertaining to the location. The query may have been received, for example, from the computing device 104.

The method may further include step 1116 for retrieving a relevant subset (e.g., a portion or all of) the event data and the sensor data according to the ontology, in response to the query.

The method may further include step 1118 for augmenting the map representation with the relevant subset of the event data and the sensor data, as illustrated, for example, in any of FIGS. 1A-1F, 2A-2C, 3-5. The augmenting of the map representation may encompass an overlap, and/or may be in textual or pictorial format.

In some examples, the method may also include, predicting a future direction of motion, a future behavior, a future parameter, or a future occurrence of an event associated with an entity based on the event data and the sensor data. This prediction may be used to implement some behavior, such as a navigation action, or other action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 12:
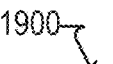
FIG. 12 illustrates a block diagram of an example computer system in which any of the embodiments described herein may be implemented.

FIG. 12 is a block diagram that illustrates a computer system 1900 upon which any of the embodiments described herein may be implemented. In some examples, the computer system 1900 may include a cloud-based or remote computing system. For example, the computer system 1900 may include a cluster of machines orchestrated as a parallel processing infrastructure. The computer system 1900 includes a bus 1902 or other communication mechanism for communicating information, one or more hardware processors 1904 coupled with bus 1902 for processing information. Hardware processor(s) 1904 may be, for example, one or more general purpose microprocessors.

The computer system 1900 also includes a main memory 1906, such as a random access memory (RAM), cache and/or other dynamic storage devices, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions.

The computer system 1900 further includes a read only memory (ROM) 1908 or other static storage device coupled to bus 1902 for storing static information and instructions for processor 1904. A storage device 1910, such as a magnetic disk, optical disk, or USB thumb drive (Flash drive), etc., is provided and coupled to bus 1902 for storing information and instructions.

The computer system 1900 may be coupled via bus 1902 to a display 1912, such as a cathode ray tube (CRT) or LCD display (or touch screen), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor(s) 1904 executing one or more sequences of one or more instructions contained in main memory 1906. Such instructions may be read into main memory 1906 from another storage medium, such as storage device 1910. Execution of the sequences of instructions contained in main memory 1906 causes processor(s) 1904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1910. Volatile media includes dynamic memory, such as main memory 1906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may retrieves and executes the instructions. The instructions received by main memory 1906 may optionally be stored on storage device 1910 either before or after execution by processor 1904.

The computer system 1900 also includes a communication interface 1918 coupled to bus 1902. Communication interface 1918 provides a two-way data communication coupling to one or more network links that are connected to one or more local networks. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN (or WAN component to communicated with a WAN). Wireless links may also be implemented. In any such implementation, communication interface 1918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1918, which carry the digital data to and from computer system 1900, are example forms of transmission media.

The computer system 1900 can send messages and receive data, including program code, through the network (s), network link and communication interface 1918. In the Internet example, a server might transmit a requested code for an application program through the Internet, the ISP, the local network and the communication interface 1918.

The received code may be executed by processor 1904 as it is received, and/or stored in storage device 1910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A system comprising:
one or more processors; and
a memory storing instructions that, when executed by the one or more processors, cause the system to perform:
    obtaining or generating a map representation, the map representation comprising geospatial objects and one or more non-geospatial objects associated with the geospatial objects;
    receiving a query pertaining to a first geospatial object within the map representation;
    in response to receiving the query:
        obtaining event data of the first geospatial object and the one or more non-geospatial objects from an external source;
        obtaining sensor data from an external sensor, the sensor data including time series data that links the first geospatial object, a second geospatial object, and a non-geospatial object, the sensor data being mapped to the event data according to an ontology, based on a geospatial or temporal relationship between the event data and the sensor data; and
        augmenting the map representation with the event data and the sensor data, wherein the augmenting of the map representation comprises an interpolated representation corresponding to a progress or a status associated with the non-geospatial object based on the time-series data and a series representation, the interpolated representation being depicted with respect to two dimensions and the series representation being depicted with respect to a third dimension.

2. The system of claim 1, wherein the ontology comprises the event data and the sensor data, and the instructions further cause the system to perform:
    updating the ontology in response to receiving updated event data or updated sensor data.

3. The system of claim 1, wherein the ontology comprises the event data and the sensor data, and the instructions further cause the system to perform:
    determining, based on the ontology, one or more related entities associated with the event data and the sensor data based on a temporal proximity or a spatial proximity between the one or more related entities and the event data or the sensor data.

4. The system of claim 1, wherein the augmenting of the map representation comprises pictorially or textually overlaying the event data and the sensor data onto the map representation.

5. The system of claim 1, wherein the map representation comprises layers, the layers comprising a JavaScript Object Notation (JSON) layer, the JSON layer comprising an atmospheric gradient, stars, or haze to improve depth perception.

6. The system of claim 1, wherein the query comprises a selection of a geographical region and additional filter criteria; and the instructions further cause the system to perform:
    determining ranges of geographic coordinates corresponding to boundaries of the selected geographical region;
    retrieving, from the ontology, any matches of entities within the ranges of geographic coordinates; and
    retaining any of the matches that satisfy the additional filter criteria.

7. The system of claim 1, wherein the instructions further cause the system to perform:

generating a track corresponding to the event data, the track indicating a previous path of travel or traverse for an entity corresponding to the event data; and overlaying the track onto the map representation.

8. The system of claim 1, wherein the instructions further cause the system to perform:

predicting a future direction of motion, a future behavior, a future parameter, or a future occurrence of an event associated with an entity based on the event data and the sensor data.

9. The system of claim 1, wherein the instructions further cause the system to perform:

receiving an annotation to a selected region or to a selected entity; and displaying the annotation within a tooltip upon detecting a hovering over the selected region or the selected entity.

10. A method comprising:

obtaining or generating a map representation, the map representation comprising geospatial objects and one or more non-geospatial objects associated with the geospatial objects;

receiving a query pertaining to a first geospatial object within the map representation;

in response to receiving the query:

obtaining event data of the first geospatial object and the one or more non-geospatial objects from an external source;

obtaining sensor data from an external sensor, the sensor data including time series data that links the first geospatial object, a second geospatial object, and a non-geospatial object, the sensor data being mapped to the event data according to an ontology, based on a geospatial or temporal relationship between the event data and the sensor data; and augmenting the map representation with the event data and the sensor data, wherein the augmenting of the map representation comprises an interpolated representation corresponding to a progress or a status associated with the non-geospatial object based on the time-series data and a series representation, the interpolated representation being depicted with respect to two dimensions and the series representation being depicted with respect to a third dimension.

11. The method of claim 10, wherein the ontology comprises the event data and the sensor data, and the method further comprises:

determining, based on the ontology, one or more related entities associated with the event data and the sensor data based on a temporal proximity or a spatial proximity between the one or more related entities and the event data or the sensor data.

12. The method of claim 10, wherein the map representation comprises layers, the layers comprising a vector layer or a JavaScript Object Notation (JSON) layer.

13. The method of claim 10, wherein the query comprises a selection of a geographical region and additional filter criteria, and the method further comprises:

determining ranges of geographic coordinates corresponding to boundaries of the selected geographical region;

retrieving, from the ontology, any matches of entities within the ranges of geographic coordinates; and retaining any of the matches that satisfy the additional filter criteria.

14. The method of claim 10, further comprising:

predicting a future direction of motion, a future behavior, a future parameter, or a future occurrence of an event associated with an entity based on the event data and the sensor data.

15. The system of claim 1, wherein the instructions that, when executed by the one or more processors, cause the system to perform:

receiving a selection of the first geospatial object or the second geospatial object; and in response to receiving the selection of the first geospatial object or the second geospatial object, separately from the interpolated representation, displaying a visual representation of an attribute represented by the time-series data corresponding to the selected first geospatial object or the selected second geospatial object.

16. The system of claim 1, wherein the second geospatial object is linked to the first geospatial object based on absolute latitude and longitude coordinates of the first geospatial object and the second geospatial object, and the instructions that, when executed by the one or more processors, cause the system to perform:

generating a hashed representation of the absolute longitude and longitude coordinates of the second geospatial object; and indexing the hashed representation for retrieval during any received query.

17. A system comprising:

one or more processors; and a memory storing instructions that, when executed by the one or more processors, cause the system to perform:

obtaining or generating a base map representation, wherein the map representation comprises objects;

generating different map representations as different map representation layers, each of the different map representations residing within a separate layer, wherein the different map representations comprise at least three selected from a group consisting of a political map, a physical map, a terrain map, a thematic map, a navigational map, a cadastral map, and a road map;

generating map data as different map data layers, wherein the map data layers comprise a first map data layer comprising geospatial data corresponding to the objects, a second map data layer comprising relationships or links among the objects, and a third map data layer comprising annotations; and augmenting the base map representation by overlaying the different map data layers atop the different map representation layers, wherein at least one of the different map data layers is overlaid atop a different map representation layer and in response to overlaying the different map data layers, overlaying the different map representation layers atop the base map representation, receiving a query pertaining to a first geospatial object within the augmented base map representation;

in response to receiving the query:

obtaining event data of the first geospatial object and one or more non-geospatial objects from an external source;

obtaining sensor data from an external sensor, the sensor data including time series data that links the first geospatial object, a second geospatial object, and a non-geospatial object, the sensor data being mapped to the event data according to an ontology, based on a geospatial or temporal relationship between the event data and the sensor data; and enhancing the augmented map representation with the event data and the sensor data, wherein the augmenting of the map representation comprises an interpolated representation corresponding to a progress or a status associated with the non-geospatial object based on the time-series data and a series representation, the interpolated representation being depicted with respect to two dimensions and the series representation being depicted with respect to a third dimension.

18. The system of claim 1, wherein the interpolated representation identifies a position of the non-geospatial object along an arc.

19. The system of claim 1, wherein the two dimensions comprise a latitude and a longitude and the third dimension comprises an altitude.

20. The system of claim 1, wherein the event data comprises a historical event.

\* \* \* \* \*